(12) United States Patent
Shibayama

(10) Patent No.: US 7,336,429 B2
(45) Date of Patent: Feb. 26, 2008

(54) ZOOM LENS SYSTEM

(75) Inventor: Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/384,432

(22) Filed: Mar. 21, 2006

(65) Prior Publication Data

US 2006/0215279 A1  Sep. 28, 2006

(30) Foreign Application Priority Data

Mar. 23, 2005  (JP) ............................. 2005-084117

(51) Int. Cl.
*G02B 15/14* (2006.01)

(52) U.S. Cl. ................. 359/690; 359/684; 359/715; 359/716; 359/740; 359/779; 359/785

(58) Field of Classification Search ............... 359/684, 359/690, 715, 716, 740, 779, 785
See application file for complete search history.

(56) References Cited

U.S. PATENT DOCUMENTS

| | | | | |
|---|---|---|---|---|
| 4,124,274 A * | 11/1978 | Tanaka et al. | ............... | 359/684 |
| 4,848,883 A * | 7/1989 | Maruyama | ............... | 359/684 |
| 5,272,564 A * | 12/1993 | Suzuki et al. | ............... | 359/684 |
| 5,572,276 A * | 11/1996 | Hirakawa | ............... | 359/684 |
| 5,737,128 A * | 4/1998 | Usui | ............... | 359/684 |
| 5,745,300 A * | 4/1998 | Usui et al. | ............... | 359/684 |
| 6,002,528 A * | 12/1999 | Tomita | ............... | 359/684 |
| 6,342,974 B1* | 1/2002 | Usui | ............... | 359/684 |
| 2005/0219708 A1 | 10/2005 | Shibayama et al. | ............... | 359/686 |

FOREIGN PATENT DOCUMENTS

JP     6-51202    4/1994

* cited by examiner

*Primary Examiner*—Evelyn A. Lester
(74) *Attorney, Agent, or Firm*—Miles & Stockbridge PC

(57) ABSTRACT

Providing a zoom lens system that satisfies making the focusing lens light and reducing a moving amount for focusing, simultaneously. The zoom lens system includes a first lens group having positive power, a second lens group having negative power and a third lens group having positive power. When zooming from a wide-angle end state to a telephoto end state, at least the first and third lens groups are moved such that a distance between the first and second lens groups increases, and a distance between the second and third lens groups decreases. The first lens group is composed of a front lens group with positive power having at least one negative lens and at least one positive lens, and a rear lens group with positive power having one positive lens. Focusing from infinity to a close object is carried out by moving only the rear lens group to the object.

24 Claims, 16 Drawing Sheets

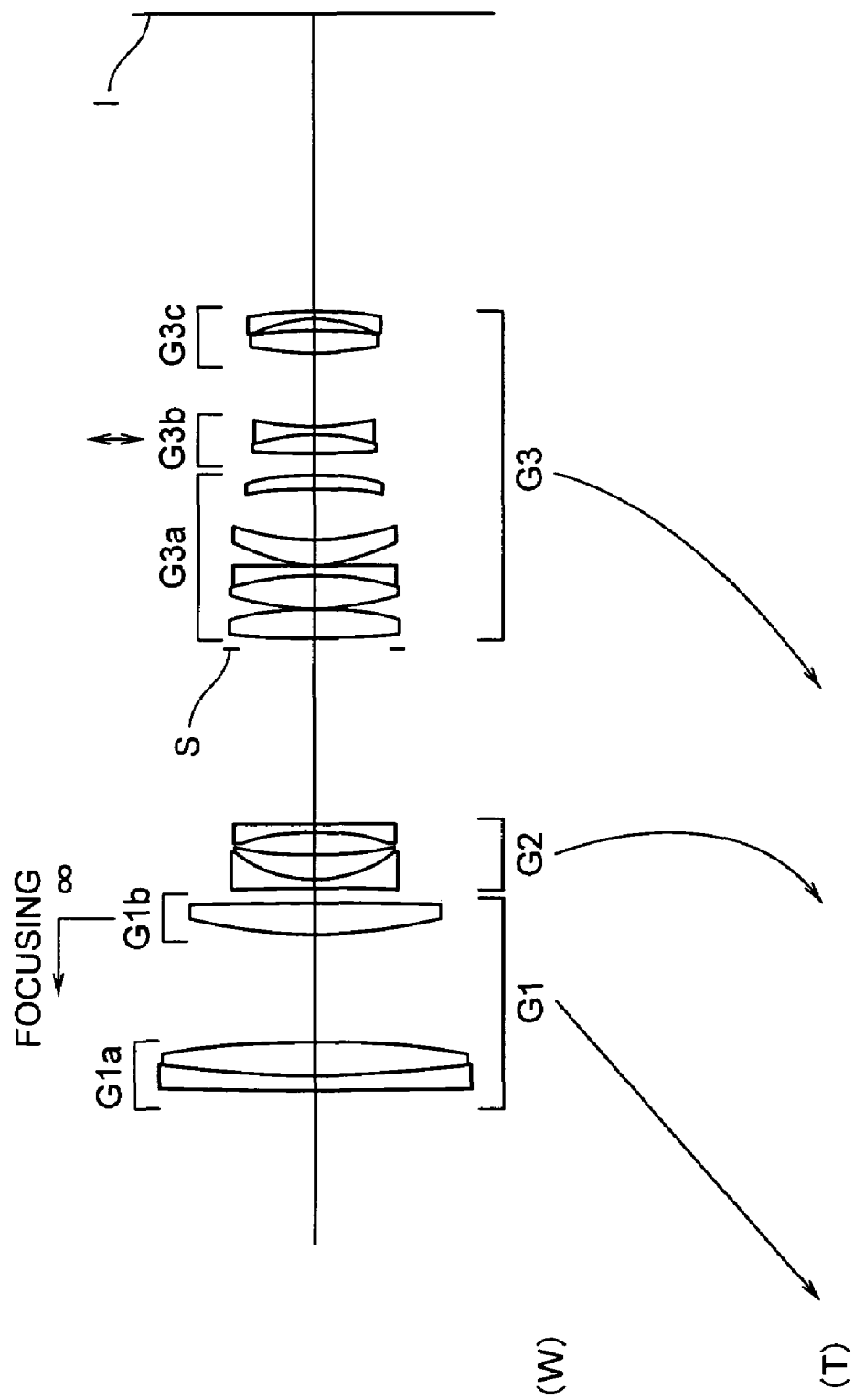

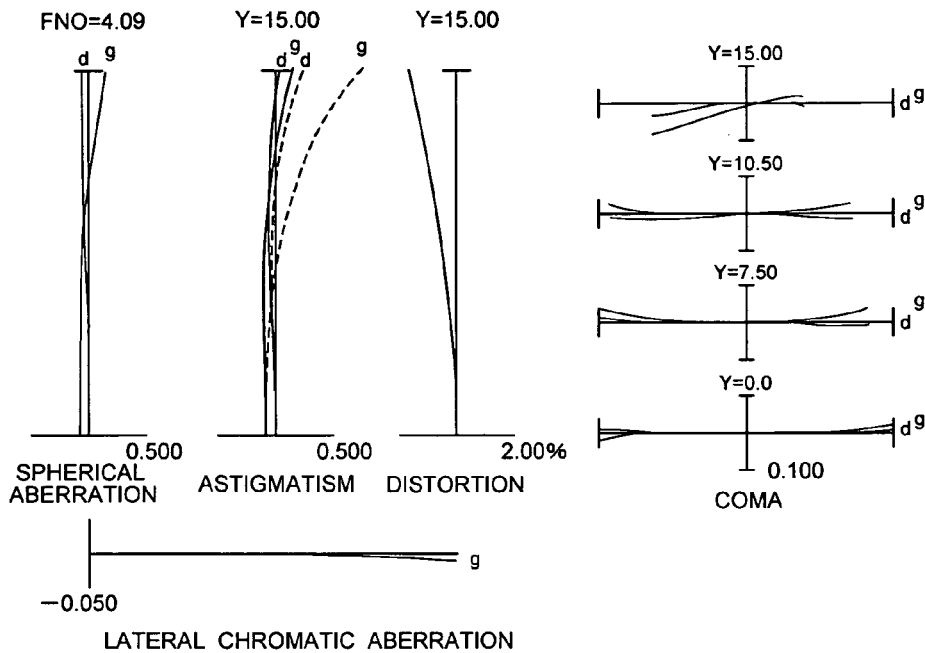
FIG.2A
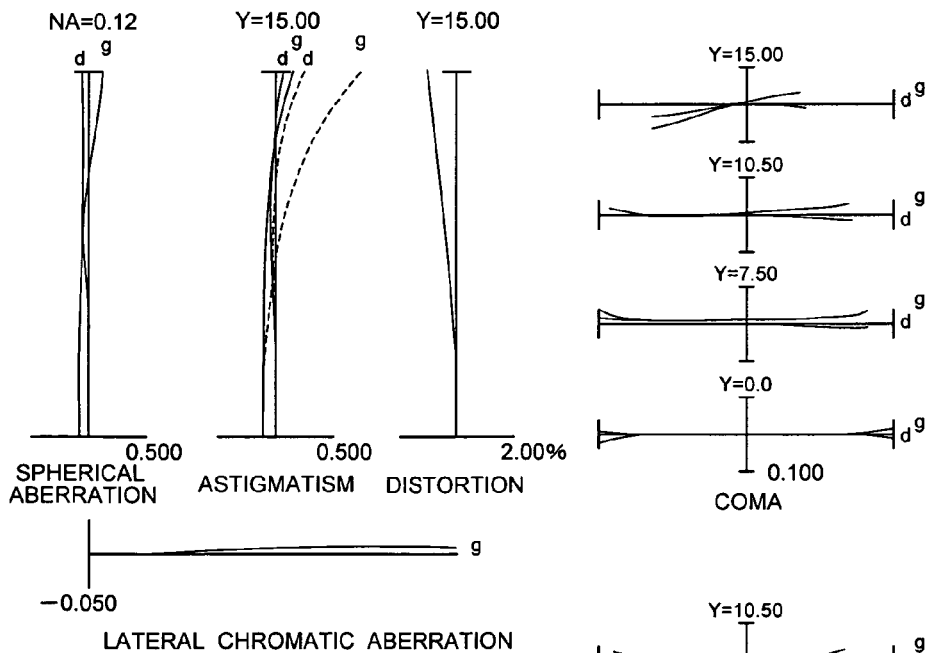
FIG.2B
FIG.2C
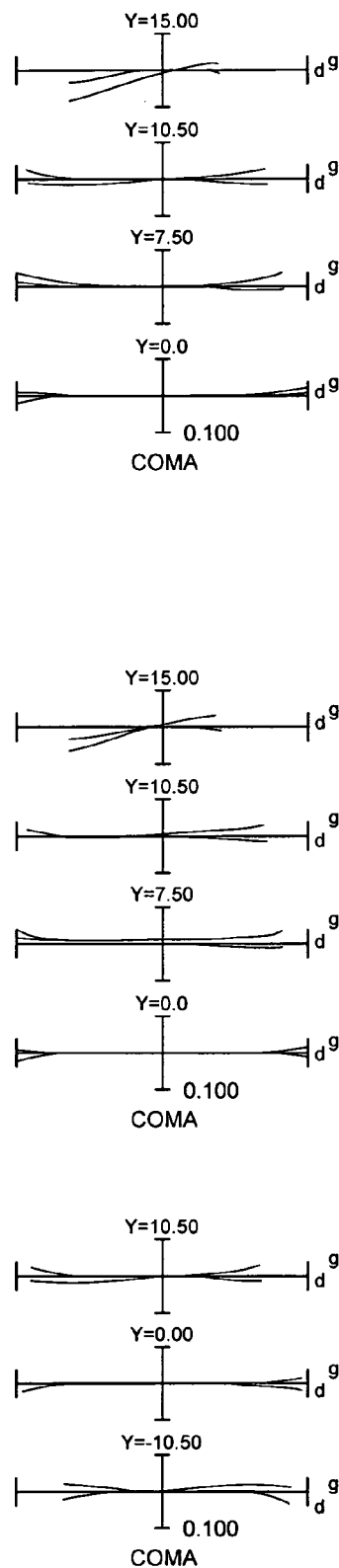

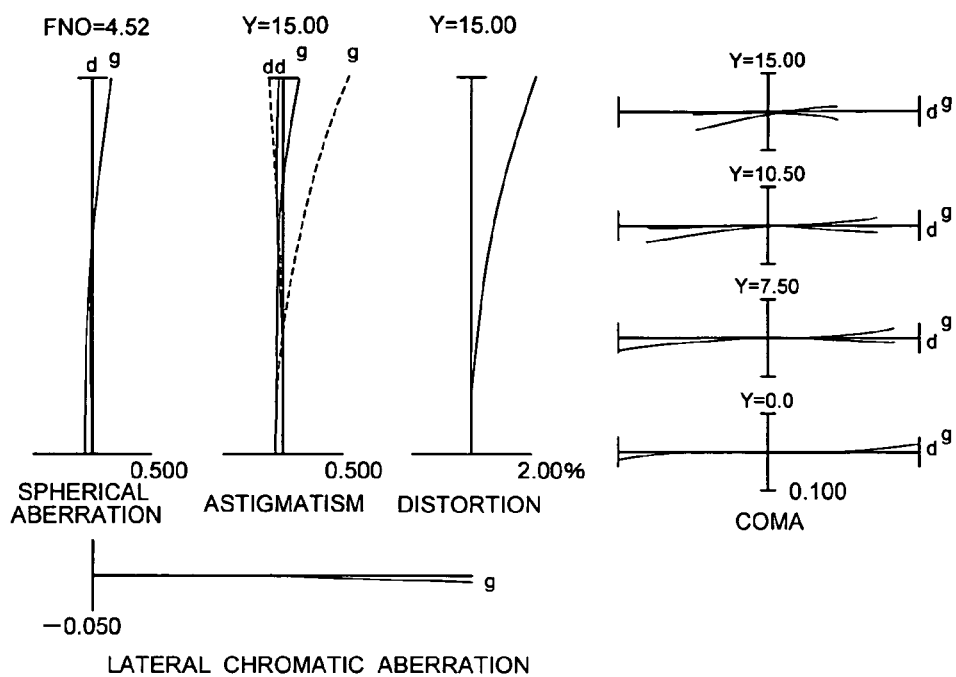
FIG.3A
FIG.3B
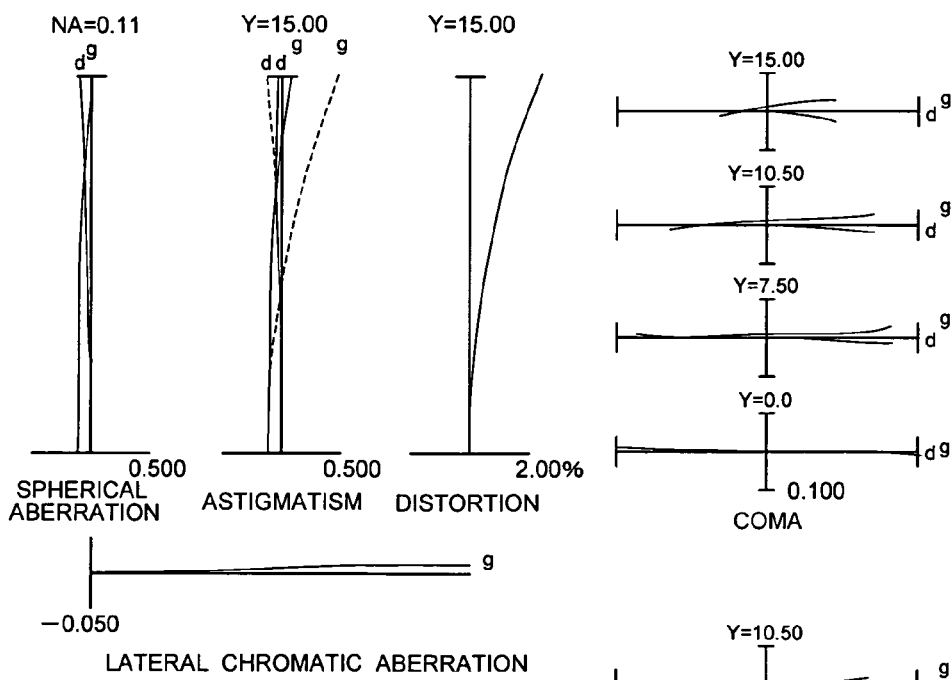
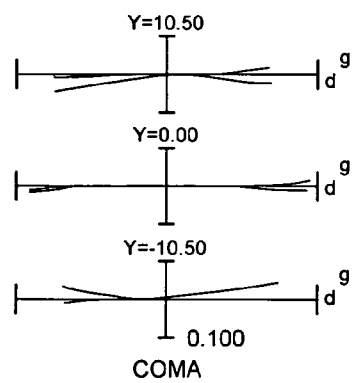
FIG.3C

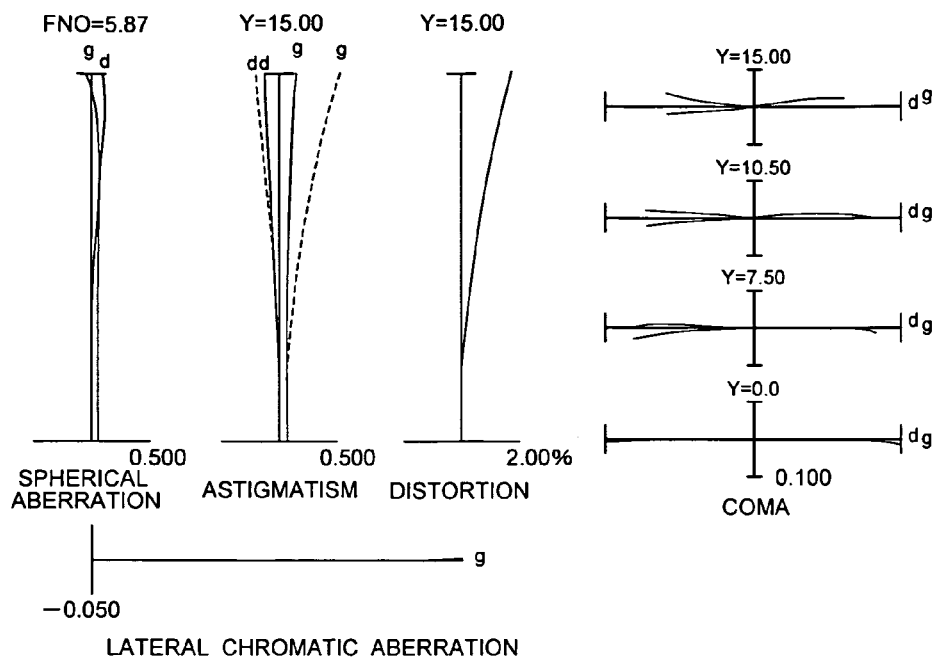
FIG.4A
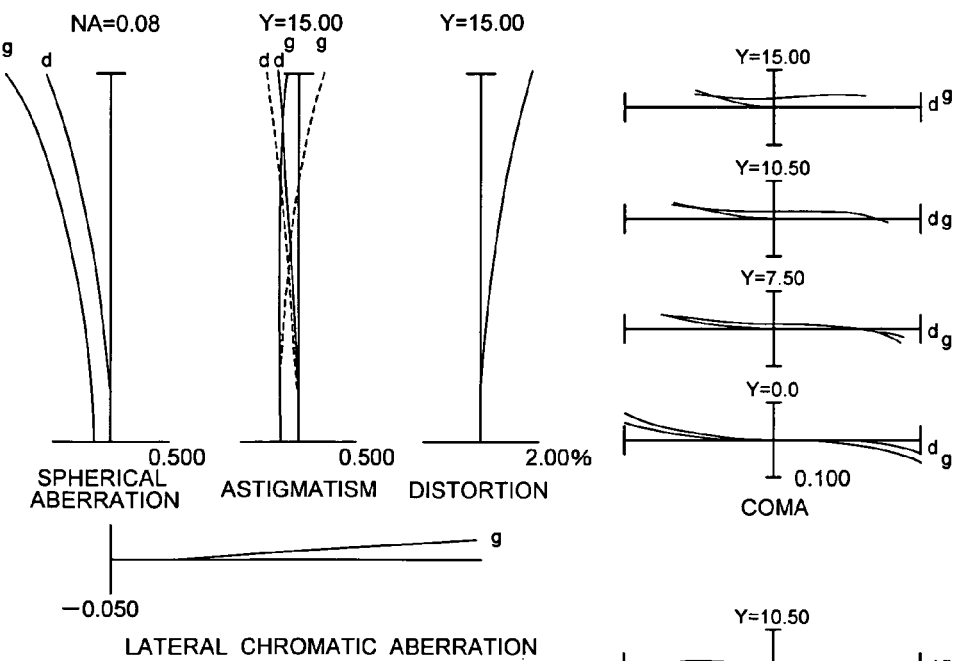
FIG.4B
FIG.4C
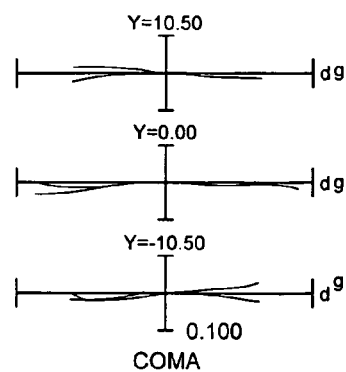

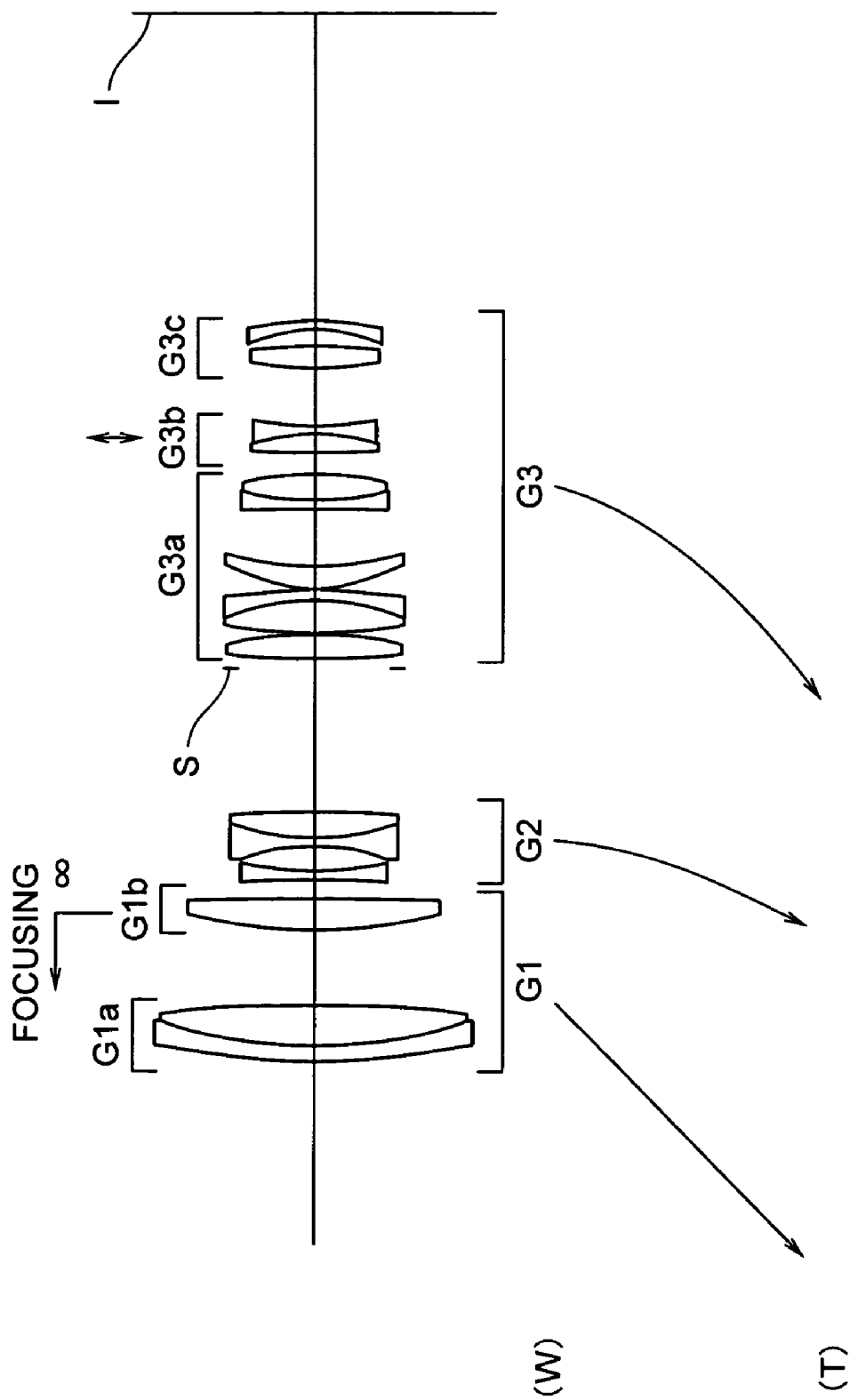

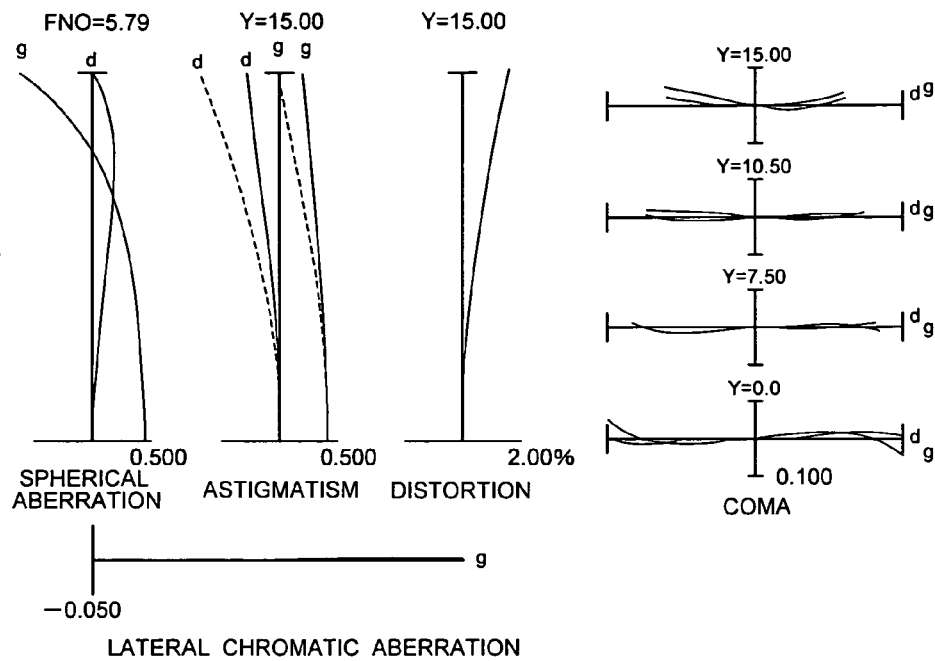
FIG.8A
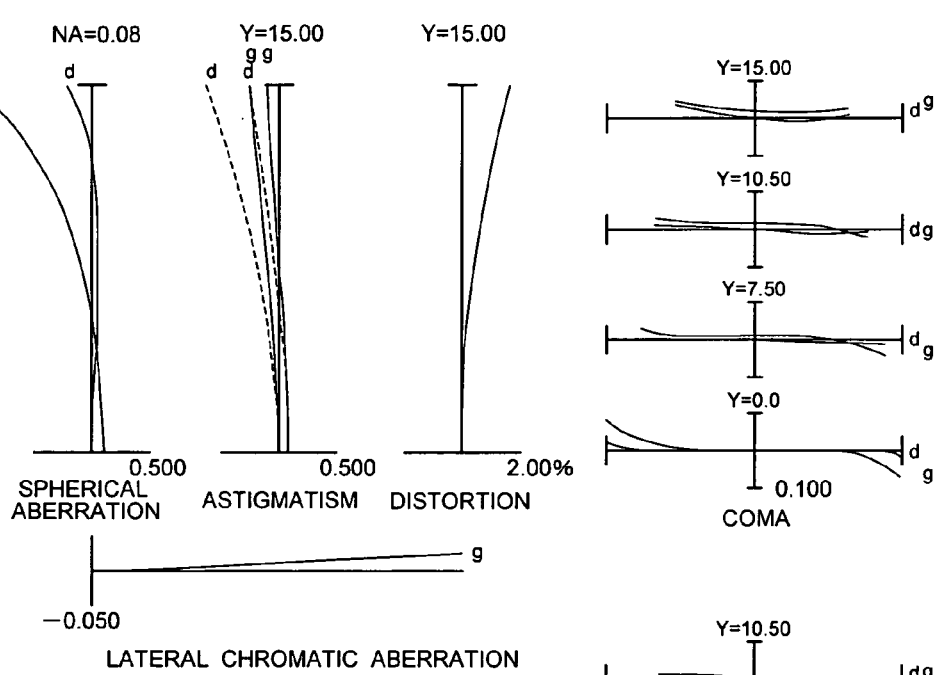
FIG.8B
FIG.8C
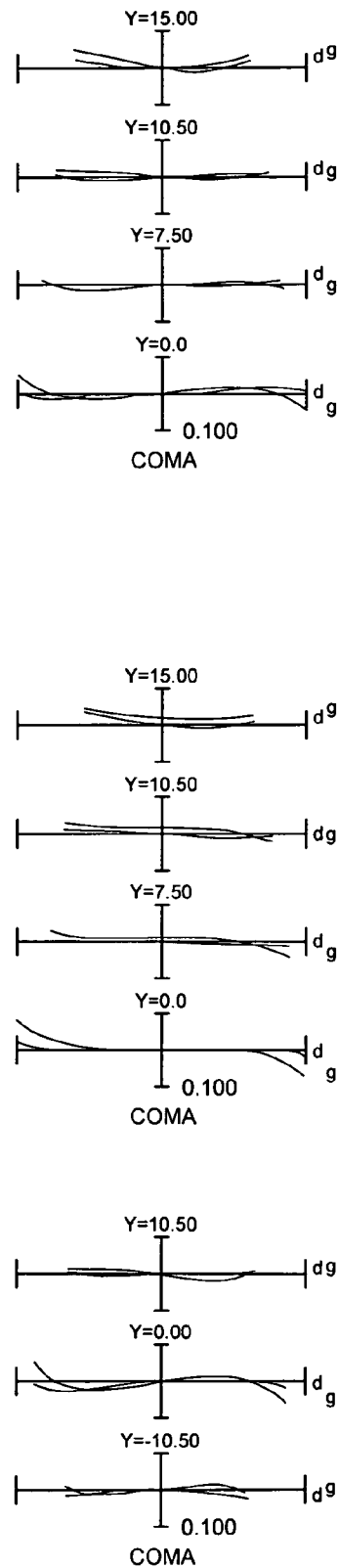

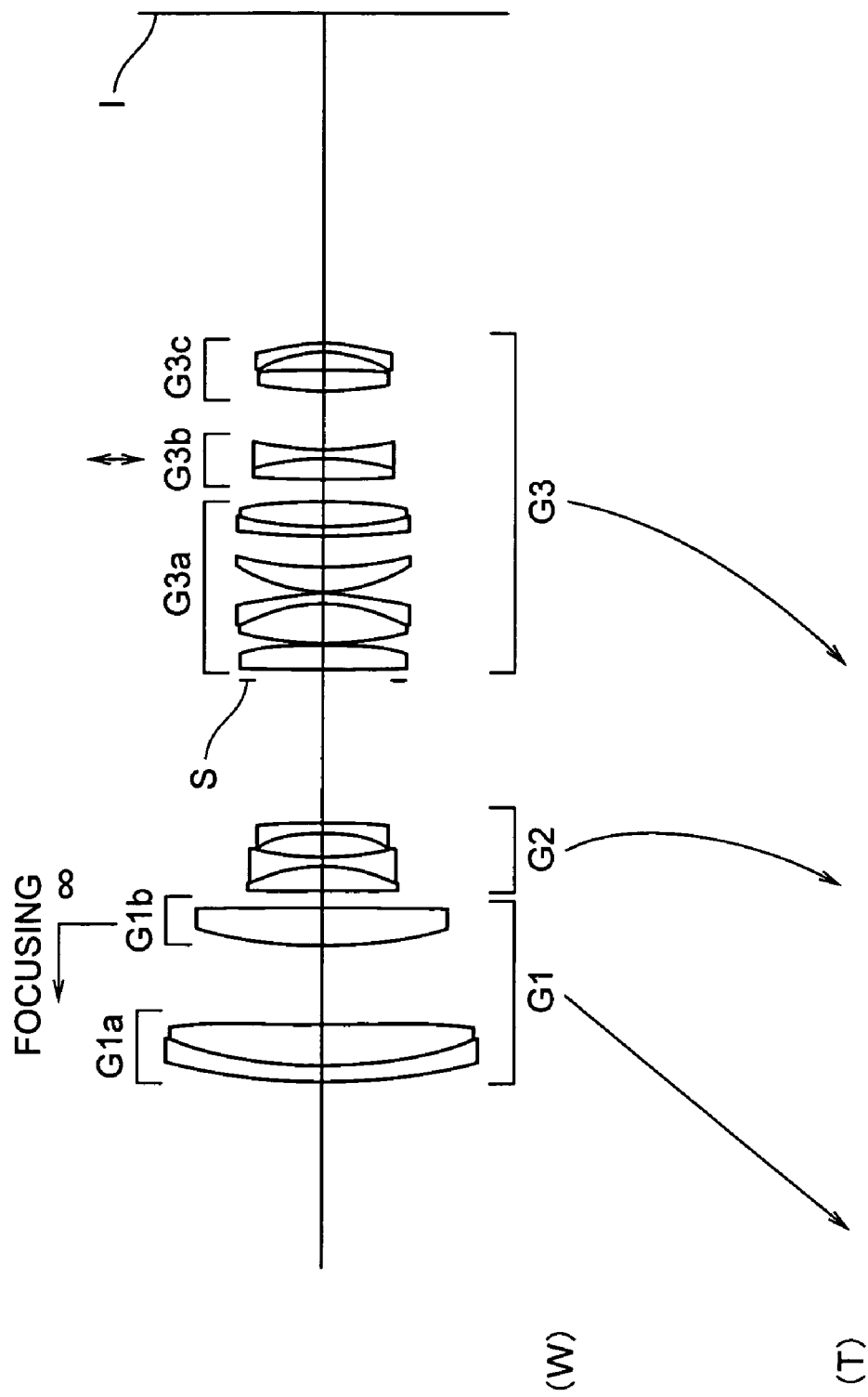

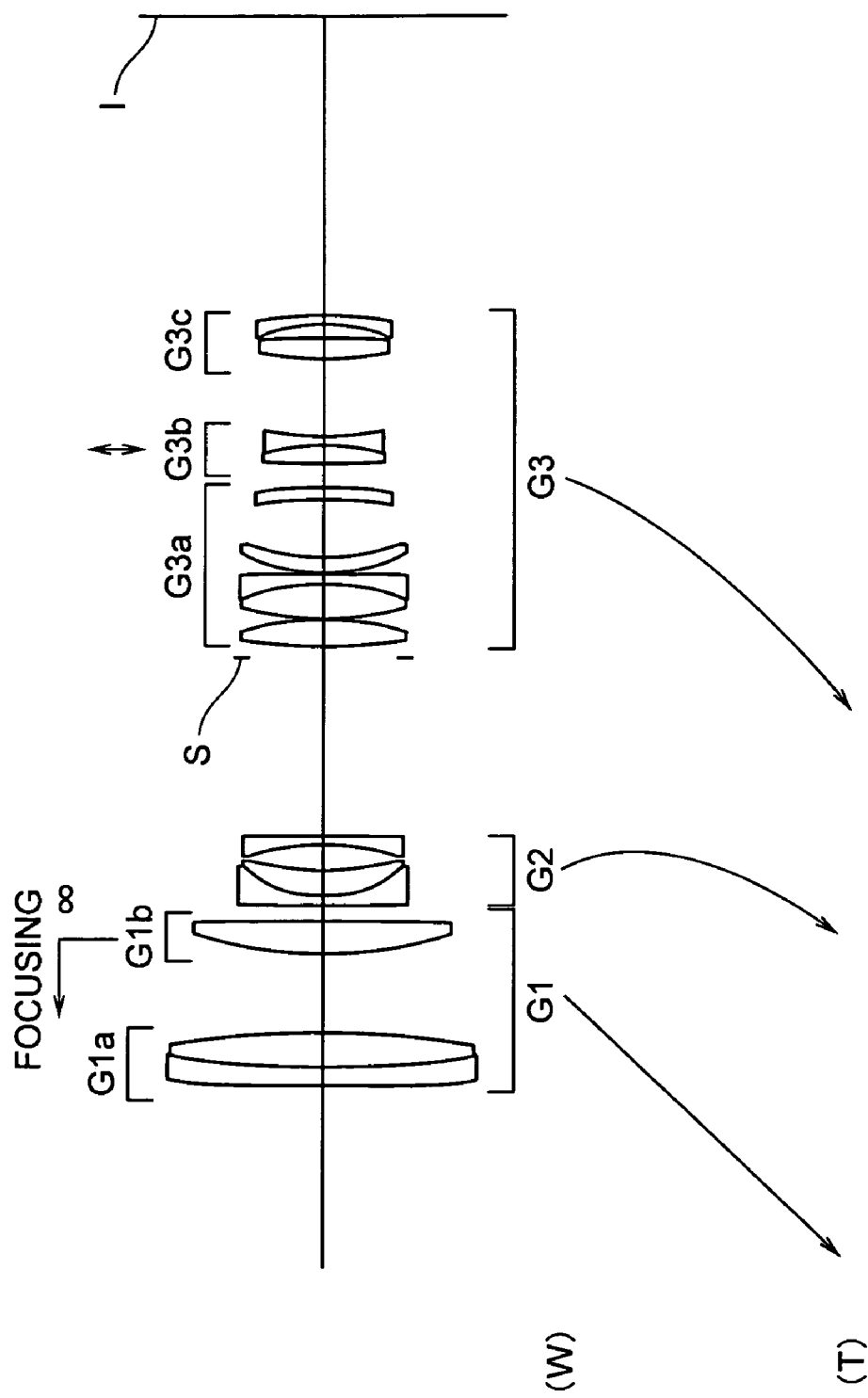

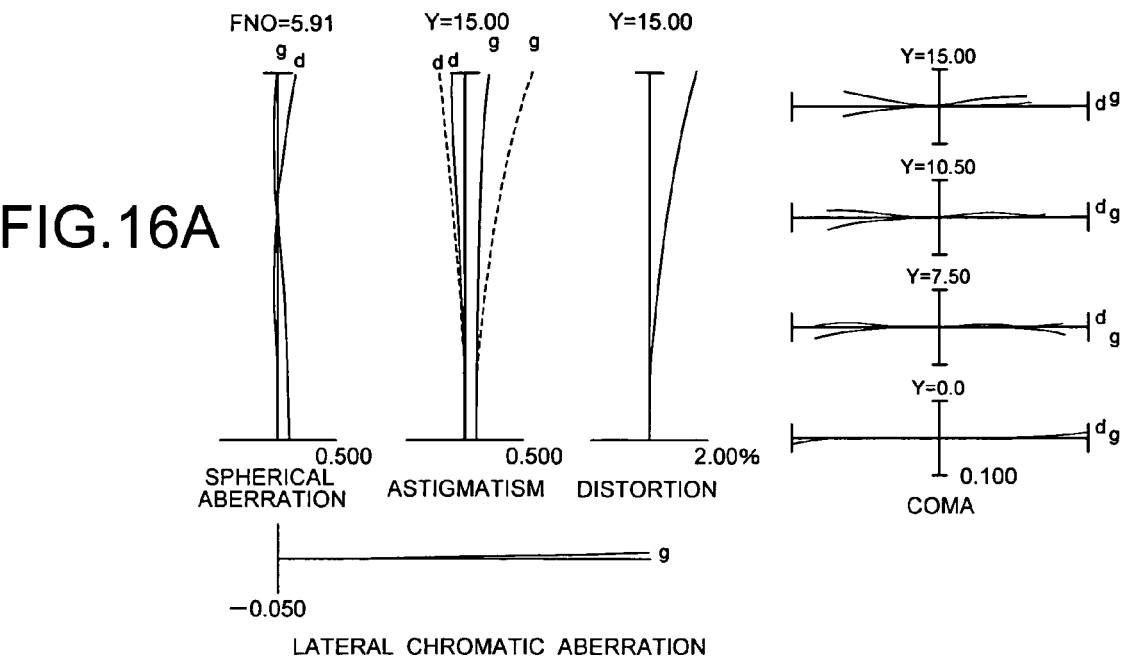
FIG.16A
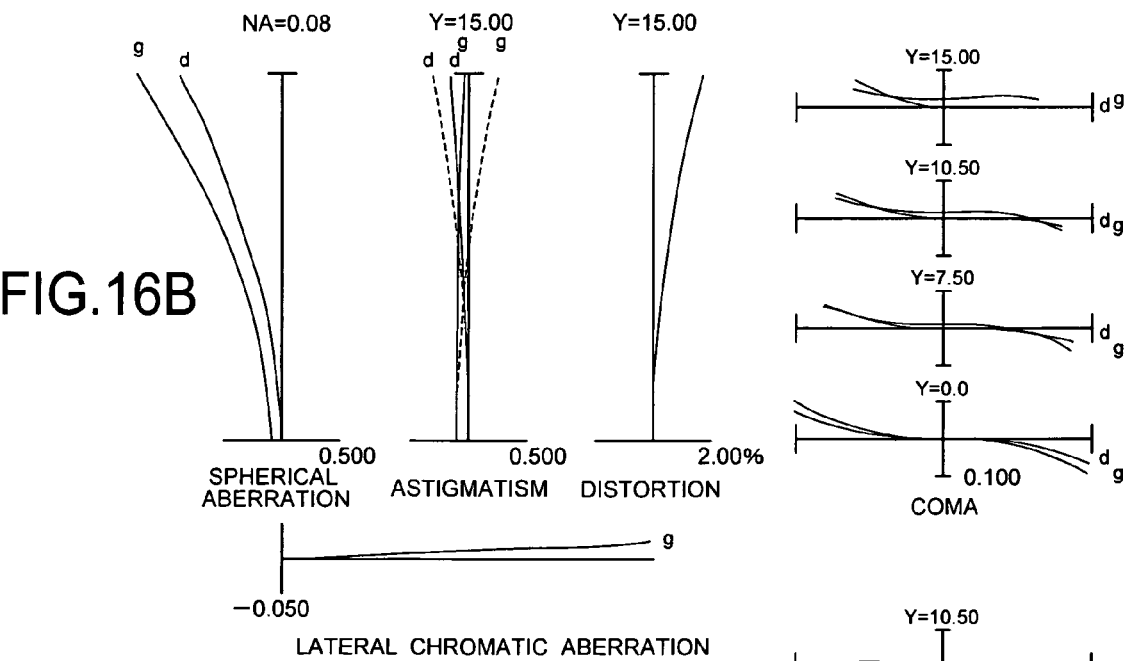
FIG.16B
FIG.16C
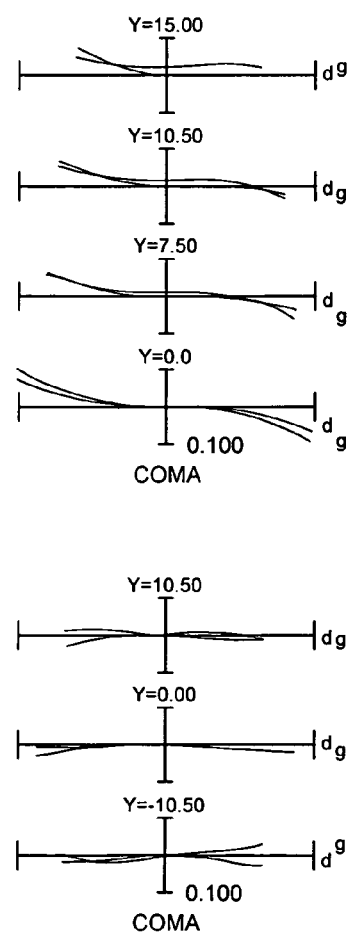

ZOOM LENS SYSTEM

The disclosure of the following priority application is herein incorporated by reference:

Japanese Patent Application No. 2005-084117 filed on Mar. 23, 2005.

BACKGROUND OF THE INVENTION

1. Field of the Invention

The present invention relates to a zoom lens system suitable for a single-lens reflex camera.

2. Related Background Art

In a focusing method of a zoom lens system, there has been a widely used method that the most object side lens group, which is a first lens group, is drawn out. In this method, there is an advantage that the moving amount for focusing does not depend on the zooming position and is determined by a distance to the object, so that it is effective for simplifying the focusing mechanism. However, a plurality of lenses have to be moved for focusing, and the weight of the focusing lens group tends to become heavy, so that it becomes difficult to make focusing speed for autofocus faster. In order to solve the problem, a method has been proposed that the first lens group divided into a front lens group having positive refractive power and a rear lens group consisting of a single lens having positive refractive power, and focusing is carried out by moving only the rear lens group to the object side so as to reduce weight of the focusing lens group (see, for example, Japanese Patent Application Laid-Open No. 6-51202).

However, in each embodiment disclosed in Japanese Patent Application Laid-Open No. 6-51202, the moving amount of the focusing lens necessary for focusing is still large, so that focusing speed in autofocus is not sufficient.

SUMMARY OF THE INVENTION

The present invention is made in view of the aforementioned problems and has an object to provide a zoom lens system that satisfies both making the focusing lens light and reducing moving amount for focusing at the same time.

According to a first aspect of the present invention, there is provided a zoom lens system including, in order from an object, a first lens group having positive refractive power, a second lens group having negative refractive power, and a third lens group having positive refractive power. When a state of lens group positions varies from a wide-angle end state to a telephoto end state, a distance between the first lens group and the second lens group increases, and a distance between the second lens group and the third lens group decreases. The first lens group is composed of, in order from the object, a front lens group having positive refractive power and a rear lens group having positive refractive power. The front lens group is composed of, in order from the object, at least one negative lens and at least one positive lens. The rear lens group is composed of a single positive lens. Focusing from infinity to a close object is carried out by moving only the rear lens group to the object.

In the first aspect of the present invention, when a state of lens group positions varies from a wide-angle end state to a telephoto end state, at least the first lens group and the third lens group are preferably moved.

In the first aspect of the present invention, the following conditional expression (1) is preferably satisfied:

$$1.1 < fT/f1b < 2.0 \quad (1)$$

where fT denotes a focal length of the zoom lens system in the telephoto end state, and f1b denotes a focal length of the rear lens group.

In the first aspect of the present invention, the following conditional expression (2) is preferably satisfied:

$$0.015 < \Delta/fT < 0.050 \quad (2)$$

where fT denotes a focal length of the zoom lens system in the telephoto end state, and $\Delta$ denotes a moving amount of the rear lens group in the telephoto end state from a state focusing on infinity to a state focusing on a close object locating at the distance of ten times of the focal length (fT) in the telephoto end state from the image plane.

In the first aspect of the present invention, when a state of lens group positions varies from the wide-angle end state to the telephoto end state, the first lens group is preferably moved to the object.

In the first aspect of the present invention, when a state of lens group positions varies from the wide-angle end state to the telephoto end state, the third lens group is preferably moved to the object.

In the first aspect of the present invention, when a state of lens group positions varies from the wide-angle end state to the telephoto end state, the second lens group is preferably moved.

In the first aspect of the present invention, when a state of lens group positions varies from the wide-angle end state to the telephoto end state, the second lens group is preferably moved at first to an image and then to the object.

In the first aspect of the present invention, the positive lens in the rear lens group preferably has a convex surface facing the object, and the following conditional expressions (3) and (4) are preferably satisfied:

$$62 < v1b \quad (3)$$

$$0.5 < (r1bF + r1bR)/(r1bR - r1bF) < 2.0. \quad (4)$$

where v1b denotes Abbe number of the positive lens in the rear lens group at d-line ($\lambda$=587.6 nm), r1bF denotes a radius of curvature of the object side surface of the positive lens in the rear lens group, and r1bR denotes a radius of curvature of the image side surface of the positive lens in the rear lens group.

In the first aspect of the present invention, it is preferable that the front lens group is composed of, in order from the object, a negative meniscus lens having a convex surface facing the object, and a double convex positive lens, and the following conditional expressions (5) and (6) are preferably satisfied:

$$0.20 < n1an - n1ap \quad (5)$$

$$30 < v1ap - v1an \quad (6)$$

where n1an denotes refractive index of the negative meniscus lens in the front lens group at d-line ($\lambda$=587.6 nm), n1ap denotes refractive index of the double convex positive lens in the front lens group at d-line, v1ap denotes Abbe number of the double convex positive lens in the front lens group at d-line, and v1an denotes Abbe number of the negative meniscus lens in the front lens group at d-line.

In the first aspect of the present invention, the negative meniscus lens and the double convex positive lens in the front lens group are preferably cemented with each other.

In the first aspect of the present invention, the following conditional expression (7) is preferably satisfied:

$$1.5 < fT/f1 < 3.0 \quad (7)$$

where fT denotes a focal length of the zoom lens system in the telephoto end state, and f1 denotes a focal length of the first lens group upon focusing infinity.

In the first aspect of the present invention, the following conditional expression (8) is preferably satisfied:

$$-13.0 < fT/f2 < -5.0 \quad (8)$$

where fT denotes a focal length of the zoom lens system in the telephoto end state, and f2 denotes a focal length of the second lens group.

In the first aspect of the present invention, the following conditional expression (9) is preferably satisfied:

$$3.0 < fT/f3 < 9.0 \quad (9)$$

where fT denotes a focal length of the zoom lens system in the telephoto end state, and f3 denotes a focal length of the third lens group.

In the first aspect of the present invention, it is preferable that the second lens group is composed of two negative lenses and a positive lens, and one of the two negative lenses and the positive lens are cemented with each other.

In the first aspect of the present invention, it is preferable that the third lens group is composed of, in order from the object, a front lens group of the third lens group having positive refractive power, a middle lens group of the third lens group having negative refractive power, and a rear lens group of the third lens group, and a camera shake is corrected by moving only the middle lens group of the third lens group perpendicularly to the optical axis.

In the first aspect of the present invention, the following conditional expressions (10), (11) and (12) are preferably satisfied:

$$4.0 < ft/f3a < 10.0 \quad (10)$$

$$-5.0 < fT/f3b < -2.0 \quad (11)$$

$$-1.0 < fT/f3c < 2.0 \quad (12)$$

where fT denotes a focal length of the zoom lens system in the telephoto end state, f3a denotes a focal length of the front lens group of the third lens group, f3b denotes a focal length of the middle lens group of the third lens group, and f3c denotes a focal length of the rear lens group of the third lens group.

According to a second aspect of the present invention, there is provided a method for forming an image of an object and varying a focal length of a zoom lens system that includes, in order from the object, a first lens group having positive refractive power, a second lens group having negative refractive power, and a third lens group having positive refractive power, comprising steps of, providing the zoom lens system in which the first lens group is composed of, in order from the object, a front lens group having positive refractive power constructed by at least one negative lens and at least one positive lens, and a rear lens group having positive refractive power constructed by a single positive lens, varying the focal length of the zoom lens system from a wide-angle end state to a telephoto end state by increasing a distance between the first lens group and the second lens group, and by decreasing a distance between the second lens group and the third lens group, and varying focusing of the zoom lens system from infinity to a close object by moving only the rear lens group to the object.

In the second aspect of the present invention, varying the focal length of the zoom lens system from the wide-angle end state to the telephoto end state is preferably carried out by moving at least the first lens group and the third lens group.

In the second aspect of the present invention, the third lens group preferably composed of, in order from the object, a front lens group of the third lens group having positive refractive power, a middle lens group of the third lens group having negative refractive power, and a rear lens group of the third lens group, and it is preferable that the method further comprises correcting a camera shake by moving the middle lens group of the third lens group perpendicularly to the optical axis.

In the second aspect of the present invention, the following conditional expression (1) is preferably satisfied:

$$1.1 < fT/f1b < 2.0 \quad (1)$$

where fT denotes a focal length of the zoom lens system in the telephoto end state, and f1b denotes a focal length of the rear lens group.

Other features and advantages according to the present invention will be readily under stood from the detailed description of the preferred embodiments in conjunction with the accompanying drawings.

BRIEF DESCRIPTION OF THE DRAWINGS

FIG. 1 is a diagram showing a lens configuration of a zoom lens according to Example 1 of the present invention.

FIGS. 2A, 2B, and 2C are graphs showing various aberrations of the zoom lens system according to Example 1 in a wide-angle end state in which FIG. 2A shows various aberrations upon focusing on infinity, FIG. 2B shows various aberrations upon focusing on a close object (1960 mm which is ten times of the focal length in the telephoto end state), and FIG. 2C shows coma when correcting rotational camera shake of 0.3 degrees upon focusing on infinity.

FIGS. 3A, 3B, and 3C are graphs showing various aberrations of the zoom lens system according to Example 1 in an intermediate focal length state in which FIG. 3A shows various aberrations upon focusing on infinity, FIG. 3B shows various aberrations upon focusing on a close object (1960 mm which is ten times of the focal length in the telephoto end state), and FIG. 3C shows coma when correcting rotational camera shake of 0.3 degrees upon focusing on infinity.

FIGS. 4A, 4B, and 4C are graphs showing various aberrations of the zoom lens system according to Example 1 in a telephoto end state in which FIG. 4A shows various aberrations upon focusing on infinity, FIG. 4B shows various aberrations upon focusing on a close object (1960 mm which is ten times of the focal length in the telephoto end state), and FIG. 4C shows coma when correcting rotational camera shake of 0.3 degrees upon focusing on infinity.

FIG. 5 is a diagram showing a lens configuration of a zoom lens system according to Example 2 of the present invention.

FIGS. 6A, 6B, and 6C are graphs showing various aberrations of the zoom lens system according to Example 2 in a wide-angle end state in which FIG. 6A shows various aberrations upon focusing on infinity, FIG. 6B shows various aberrations upon focusing on a close object (1959.9 mm which is ten times of the focal length in the telephoto end state), and FIG. 6C shows coma when correcting rotational camera shake of 0.3 degrees upon focusing on infinity.

FIGS. 7A, 7B, and 7C are graphs showing various aberrations of the zoom lens system according to Example 2 in an intermediate focal length state in which FIG. 7A shows various aberrations upon focusing on infinity, FIG. 7B shows various aberrations upon focusing on a close object (1959.9 mm which is ten times of the focal length in the telephoto end state), and FIG. 7C shows coma when correcting rotational camera shake of 0.3 degrees upon focusing on infinity.

FIGS. 8A, 8B, and 8C are graphs showing various aberrations of the zoom lens system according to Example 2 in a telephoto end state in which FIG. 8A shows various aberrations upon focusing on infinity, FIG. 8B shows various aberrations upon focusing on a close object (1959.9 mm which is ten times of the focal length in the telephoto end state), and FIG. 8C shows coma when correcting rotational camera shake of 0.3 degrees upon focusing on infinity.

FIG. 9 is a diagram showing a lens configuration of a zoom lens system according to Example 3 of the present invention.

FIGS. 10A, 10B, and 10C are graphs showing various aberrations of the zoom lens system according to Example 3 in a wide-angle end state in which FIG. 10A shows various aberrations upon focusing on infinity, FIG. 10B shows various aberrations upon focusing on a close object (1959.6 mm which is ten times of the focal length in the telephoto end state), and FIG. 10C shows coma when correcting rotational camera shake of 0.3 degrees upon focusing on infinity.

FIGS. 11A, 11B, and 11C are graphs showing various aberrations of the zoom lens system according to Example 3 in an intermediate focal length state in which FIG. 11A shows various aberrations upon focusing on infinity, FIG. 11B shows various aberrations upon focusing on a close object (1959.6 mm which is ten times of the focal length in the telephoto end state), and FIG. 11C shows coma when correcting rotational camera shake of 0.3 degrees upon focusing on infinity.

FIGS. 12A, 12B, and 12C are graphs showing various aberrations of the zoom lens system according to Example 3 in a telephoto end state in which FIG. 12A shows various aberrations upon focusing on infinity, FIG. 12B shows various aberrations upon focusing on a close object (1959.6 mm which is ten times of the focal length in the telephoto end state), and FIG. 12C shows coma when correcting rotational camera shake of 0.3 degrees upon focusing on infinity.

FIG. 13 is a diagram showing a lens configuration of a zoom lens system according to Example 4 of the present invention.

FIGS. 14A, 14B, and 14C are graphs showing various aberrations of the zoom lens system according to Example 4 in a wide-angle end state in which FIG. 14A shows various aberrations upon focusing on infinity, FIG. 14B shows various aberrations upon focusing on a close object (1960 mm which is ten times of the focal length in the telephoto end state), and FIG. 14C shows coma when correcting rotational camera shake of 0.3 degrees upon focusing on infinity.

FIGS. 15A, 15B, and 15C are graphs showing various aberrations of the zoom lens system according to Example 4 in an intermediate focal length state in which FIG. 15A shows various aberrations upon focusing on infinity, FIG. 15B shows various aberrations upon focusing on a close object (1960 mm which is ten times of the focal length in the telephoto end state), and FIG. 15C shows coma when correcting rotational camera shake of 0.3 degrees upon focusing on infinity.

FIGS. 16A, 16B, and 16C are graphs showing various aberrations of the zoom lens system according to Example 4 in a telephoto end state in which FIG. 16A shows various aberrations upon focusing on infinity, FIG. 16B shows various aberrations upon focusing on a close object (1960 mm which is ten times of the focal length in the telephoto end state), and FIG. 16C shows coma when correcting rotational camera shake of 0.3 degrees upon focusing on infinity.

DESCRIPTION OF THE MOST PREFERRED EMBODIMENTS

Figure 6A:
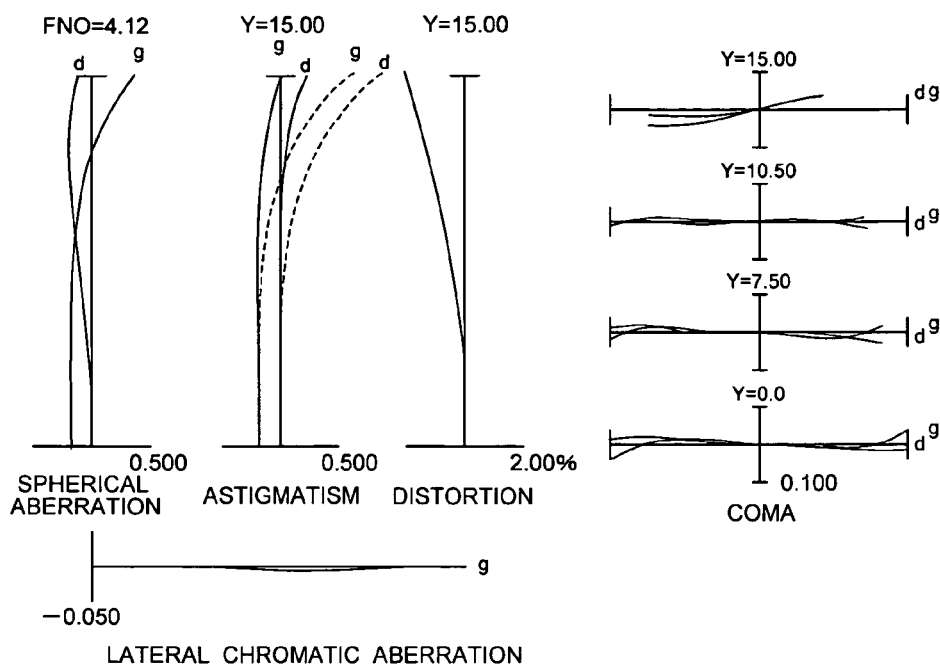

Embodiments according to the present invention are explained below in detail with reference to accompanying drawings.

A zoom lens system according to an embodiment of the present invention is composed of, in order from an object, a first lens group having positive refractive power, a second lens group having negative refractive power and a third lens group having positive refractive power. When a state of lens group positions varies from a wide-angle end state to a telephoto end state, at least the first lens group and the third lens group are moved such that a distance between the first lens group and the second lens group increases, and a distance between the second lens group and the third lens group decreases. The first lens group is composed of, in order from the object, a front lens group $G1a$ having positive refractive power and a rear lens group $G1b$ having positive refractive power. The front lens group $G1a$ is composed of at least one negative lens and at least one positive lens. The rear lens group $G1b$ is composed of a single positive lens. Focusing from infinity to a close object is carried out by moving the rear lens group $G1b$ to the object.

With constructing the zoom lens system in this manner, the focusing lens can be light, so that it is advantageous for fast autofocus.

In a zoom lens system according to an embodiment of the present invention, the following conditional expression (1) is preferably satisfied:

$$1.1 < fT/f1b < 2.0 \tag{1}$$

where fT denotes a focal length of the zoom lens system in the telephoto end state, and $f1b$ denotes a focal length of the rear lens group $G1b$ in the first lens group.

Conditional expression (1) defines an appropriate range of the refractive power of the rear lens group $G1b$. When the ratio $fT/f1b$ is equal to or exceeds the upper limit of conditional expression (1), refractive power of the rear lens group $G1b$ becomes large, and variations in aberrations upon focusing become large, so that it is undesirable. On the other hand, when the ratio $fT/f1b$ is equal to or falls below the lower limit of conditional expression (1), refractive power of the rear lens group $G1b$ becomes small, and the moving amount for focusing becomes large. Accordingly, it becomes an obstacle to make focusing speed faster upon autofocus. In order to secure the effect of the present invention, it is preferable to set the upper limit of conditional expression (1) to 1.90. In order to secure the effect of the present invention, it is preferable to set the lower limit of conditional expression (1) to 1.20.

In the zoom lens according to the embodiment of the present invention, it is preferable that the following conditional expression (2) is satisfied:

$$0.015 < \Delta/fT < 0.050 \tag{2}$$

where fT denotes a focal length of the zoom lens system in the telephoto end state, and Δ denotes a moving amount of the rear lens group G1b in the telephoto end state from a state focusing on infinity to a state focusing on a close object locating at the distance of ten times of the focal length (fT) in the telephoto end state from the image plane.

Conditional expression (2) defines an appropriate range of the moving amount of the rear lens group G1b for focusing. When the ratio Δ/fT is equal to or exceeds the upper limit of conditional expression (2), the moving amount for focusing becomes large, so that it becomes an obstacle to quick autofocus. On the other hand, when the ratio Δ/fT is equal to or falls below the lower limit of conditional expression (2), although the moving amount for focusing becomes small, the ratio of the moving amount of the focal plane to that of the rear lens group G1b becomes large. As a result, upon carrying out autofocus, higher accuracy is required for stopping the focusing lens, and fine adjustment has to be repeated, so that it becomes an obstacle to quick autofocus. In order to secure the effect of the present invention, it is preferable to set the upper limit of conditional expression (2) to 0.040. In order to secure the effect of the present invention, it is preferable to set the lower limit of conditional expression (2) to 0.020.

In the zoom lens system according to the embodiment of the present invention, it is suitable for miniaturizing the zoom lens system to move the first lens group to the object upon zooming from the wide-angle end state to the telephoto end state.

In the zoom lens system according to the embodiment of the present invention, it is suitable for making the zoom lens system to be a high zoom ratio to move the third lens group to the object upon zooming from the wide-angle end state to the telephoto end state.

In the zoom lens system according to the embodiment of the present invention, it is effective for correcting astigmatism over entire zoom range from the wide-angle end state to the telephoto end state to moved the second lens group upon zooming from the wide-angle end state to the telephoto end state. In particular, it is optimum for correcting astigmatism to move the second lens group at first to the image and then to the object upon zooming from the wide-angle end state to the telephoto end state.

In the zoom lens system according to the embodiment of the present invention, it is preferable for correcting aberrations that the positive lens in the rear lens group G1b in the first lens group has a convex surface facing the object, and the following conditional expressions (3) and (4) are preferably satisfied:

$$62 < v1b \tag{3}$$

$$0.5 < (r1bF + r1bR)/(r1bR - r1bF) < 2.0 \tag{4}$$

where v1b denotes Abbe number of the positive lens in the rear lens group G1b at d-line (λ=587.6 nm), r1bF denotes the radius of curvature of the object side surface of the positive lens in the rear lens group G1b, and r1bR denotes the radius of curvature of the image side surface of the positive lens in the rear lens group G1b.

Conditional expression (3) defines an appropriate range of Abbe number of the positive lens in the rear lens group G1b. When the value v1b is equal to or falls below the lower limit of conditional expression (3), variation in chromatic aberration upon focusing becomes large, so that it is undesirable. In order to secure the effect of the present invention, it is preferable to set the lower limit of conditional expression (3) to 68.

Conditional expression (4) defines an appropriate shape of the positive lens in the rear lens group G1b. When the ratio (r1bF+r1bR)/(r1bR−r1bF) is equal to or either exceeds or falls below the upper limit or lower limit, respectively, variation in spherical aberration upon focusing becomes large, so that it is undesirable. In order to secure the effect of the present invention, it is preferable to set the upper limit of conditional expression (4) to 1.5. In order to secure the effect of the present invention, it is preferable to set the lower limit of conditional expression (4) to 0.7.

In the zoom lens system according to the embodiment of the present invention, it is preferable for correcting aberrations that the front lens group G1a of the first lens group is composed of, in order from the object, a negative meniscus lens having a convex surface facing the object and a double convex positive lens, and the following conditional expressions (5) and (6) are preferably satisfied:

$$0.20 < n1an - n1ap \tag{5}$$

$$30 < v1ap - v1an \tag{6}$$

where n1an denotes refractive index of the negative meniscus lens in the front lens group G1a at d-line (λ=587.6 nm), n1ap denotes refractive index of the double convex positive lens in the front lens group G1a at d-line, v1ap denotes Abbe number of the double convex positive lens in the front lens group G1a at d-line, and v1an denotes Abbe number of the negative meniscus lens in the front lens group G1a at d-line (λ=587.6 nm).

Conditional expression (5) defines an appropriate range of difference in refractive index of the negative meniscus lens and that of the double convex positive lens in the front lens group G1a. When the value n1an−n1ap is equal to or falls below the lower limit of conditional expression (5), it becomes difficult to correct spherical aberration and coma preferably. In order to secure the effect of the present invention, it is preferable to set the lower limit of conditional expression (5) to 0.25.

Conditional expression (6) is for correcting chromatic aberration and defines an appropriate range of difference in Abbe number of the double convex positive lens and that of the negative meniscus lens in the front lens group G1a. When the value v1ap−v1an is equal to or falls below the lower limit of conditional expression (6), it becomes difficult to preferably correct longitudinal chromatic aberration and lateral chromatic aberration. In order to secure the effect of the present invention, it is preferable to set the lower limit of conditional expression (6) to 40.

Moreover, in the zoom lens system according to the embodiment of the present invention, it is preferable that the negative meniscus lens and the double convex positive lens in the front lens group G1a are cemented with each other. With this construction, decentering tolerance of the lenses in the front lens group can be mitigated.

In the zoom lens system according to the embodiment of the present invention, the following conditional expression (7) is preferably satisfied:

$$1.5 < fT/f1 < 3.0 \tag{7}$$

where fT denotes a focal length of the zoom lens system in the telephoto end state, and f1 denotes a focal length of the first lens group upon focusing on infinity.

Conditional expression (7) defines an appropriate range of refractive power of the first lens group. When the ratio fT/f1 is equal to or exceeds the upper limit of conditional expression (7), refractive power of the first lens group becomes large resulting in increase in various aberrations in the telephoto end state, so that it is undesirable. On the other hand, when the ratio fT/f1 is equal to or falls below the lower limit of conditional expression (7), refractive power of the first lens group becomes weak, so that it becomes difficult to miniaturize the total lens length of the zoom lens system. In order to secure the effect of the present invention, it is preferable to set the upper limit of conditional expression (7) to 2.8. In order to secure the effect of the present invention, it is preferable to set the lower limit of conditional expression (7) to 1.7.

In the zoom lens system according to the embodiment of the present invention, the following conditional expression (8) is preferably satisfied:

$$-13.0<fT/f2<-5.0 \tag{8}$$

where fT denotes a focal length of the zoom lens system in the telephoto end state, and f2 denotes a focal length of the second lens group.

Conditional expression (8) defines an appropriate range of refractive power of the second lens group. When the ratio fT/f2 is equal to or exceeds the upper limit of conditional expression (8), refractive power of the second lens group becomes small, and it becomes difficult to construct the zoom lens system to be a high zoom ratio, so it is undesirable. On the other hand, when the ratio fT/f2 is equal to or falls below the lower limit of conditional expression (8), refractive power of the second lens group becomes large, and various aberrations including astigmatism become large, so that it is undesirable. In order to secure the effect of the present invention, it is preferable to set the upper limit of conditional expression (8) to −6.5. In order to secure the effect of the present invention, it is preferable to set the lower limit of conditional expression (8) to −11.5.

In the zoom lens system according to the embodiment of the present invention, the following conditional expression (9) is preferably satisfied:

$$3.0<fT/f3<9.0 \tag{9}$$

where fT denotes a focal length of the zoom lens system in the telephoto end state, and f3 denotes a focal length of the third lens group.

Conditional expression (9) defines an appropriate range of refractive power of the third lens group. When the ratio fT/f3 is equal to or exceeds the upper limit of conditional expression (9), refractive power of the third lens group becomes large. Accordingly, it becomes difficult to secure a sufficient back focal length requited for a single-lens reflex camera, so that it is undesirable. On the other hand, when the ratio fT/f3 is equal to or falls below the lower limit of conditional expression (9), refractive power of the third lens group becomes small, so that it becomes difficult to miniaturize the total lens length of the zoom lens system. In order to secure the effect of the present invention, it is preferable to set the upper limit of conditional expression (9) to 8.0. In order to secure the effect of the present invention, it is preferable to set the lower limit of conditional expression (9) to 4.5.

In the zoom lens system according to the embodiment of the present invention, it is preferable that the second lens group is composed of two negative lenses and one positive lens, and one of the two negative lenses and the positive lens are cemented with each other. With this construction, it becomes possible to realize preferable aberration correction with fewer number of lenses.

In the zoom lens system according to the embodiment of the present invention, the third lens group is composed of, in order from the object, a front lens group G3a of the third lens group having positive refractive power, a middle lens group G3b of the third lens group having negative refractive power and a rear lens group G3c of the third lens group. Only the middle lens group G3b is constructed to be movable in the direction perpendicular to the optical axis. With this construction, a camera shake can be corrected by moving the middle lens group G3b perpendicularly to the optical axis on the basis of an output from an angular velocity detector arranged separately.

In order to suppress generation of aberration such as decentering aberration upon moving the lens group perpendicularly to the optical axis, it is preferable to dispose lens groups to suppress generation of decentering aberration before and after the lens group moving perpendicularly to the optical axis. Moreover, in order to make smaller the effective diameter of the lens group moving perpendicularly to the optical axis, it is preferable that the lens group moving perpendicularly to the optical axis has negative refractive power. Accordingly, in order to miniaturizing a driving mechanism for correcting decentering aberration and a camera shake, it is preferable to construct such that the middle lens group G3b locating at the center of the third lens group has negative refractive power, and only the middle lens group G3b is moved perpendicularly to the optical axis upon correcting a camera shake.

In the zoom lens system according to the embodiment of the present invention, the following conditional expressions (10) through (12) are preferably satisfied:

$$4.0<fT/f3a<10.0 \tag{10}$$

$$-5.0<fT/f3b<-2.0 \tag{11}$$

$$-1.0<fT/f3c<2.0 \tag{12}$$

where fT denotes a focal length of the zoom lens system in the telephoto end state, f3a denotes a focal length of the front lens group G3a of the third lens group, f3b denotes a focal length of the middle lens group G3b of the third lens group, and f3c denotes a focal length of the rear lens group G3c of the third lens group.

By satisfying conditional expressions (10) through (12), refractive power distribution suitable for correcting camera shake can be accomplished. In particular, conditional expression (11) defines an appropriate moving amount of the image on the image plane with respect to the moving amount of the middle lens group G3b upon correcting a camera shake. When the ratio fT/f3b is equal to or exceeds the upper limit of conditional expression (11), refractive power of the middle lens group G3b becomes small, and the moving amount of the image on the image plane with respect to the moving amount of the middle lens group G3b becomes small. Accordingly, the moving amount of the middle lens group G3b for correcting a camera shake is necessary to become large, and the driving mechanism thereof becomes large, so that it is undesirable. On the other hand, when the ratio fT/f3b is equal to or falls below the lower limit of conditional expression (11), refractive power of the middle lens group G3b becomes large, and the moving amount of the image on the image plane with respect to the moving amount of the middle lens group G3b becomes large. Accordingly, it causes a problem that driving accuracy of the middle lens group G3b for correcting a camera shake becomes too high to properly control. Conditional expressions (10) and (12) define refractive power of the front lens group G3a and the rear lens group G3c for suppressing generation of aberrations such as decentering aberration upon moving the middle lens group G3b perpendicularly to the optical axis under conditional expression (11). When the respective ratios fT/f3a and fT/f3c are equal to or exceed or fall below any one of respective upper limits or lower limits, generation of aberrations upon moving the middle lens group G3b perpendicularly to the optical axis increases, so that it is undesirable.

A zoom lens system according to an embodiment of the present invention is composed of, in order from an object, a first lens group having positive refractive power, a second lens group having negative refractive power and a third lens group having positive refractive power. When a state of lens group positions varies from a wide-angle end state to a telephoto end state, a distance between the first lens group and the second lens group increases, and a distance between the second lens group and the third lens group decreases. The first lens group is composed of, in order from the object, a front lens group G1a having positive refractive power and a rear lens group G1b having positive refractive power. The front lens group G1a is composed of at least one negative lens and at least one positive lens. The rear lens group G1b is composed of a single positive lens. Focusing from infinity to a close object is carried out by moving the rear lens group G1b to the object. The following conditional expression (1) is satisfied:

$$1.1 < fT/f1b < 2.0 \qquad (1)$$

where fT denotes a focal length of the zoom lens system in the telephoto end state, and f1b denotes a focal length of the rear lens group G1b.

With constructing the zoom lens system in this manner, the focusing lens can be light, so that it is advantageous for fast autofocus.

Conditional expression (1) defines an appropriate range of the refractive power of the rear lens group G1b. When the ratio fT/f1b is equal to or exceeds the upper limit of conditional expression (1), refractive power of the rear lens group G1b becomes large, and variations in aberrations upon focusing become large, so that it is undesirable. On the other hand, when the ratio fT/f1b is equal to or falls below the lower limit of conditional expression (1), refractive power of the rear lens group G1b becomes small, and the moving amount for focusing becomes large. Accordingly, it becomes an obstacle to make focusing speed faster upon autofocus. In order to secure the effect of the present invention, it is preferable to set the upper limit of conditional expression (1) to 1.90. In order to secure the effect of the present invention, it is preferable to set the lower limit of conditional expression (1) to 1.20.

A zoom lens system according to an embodiment of the present invention is composed of, in order from an object, a first lens group having positive refractive power, a second lens group having negative refractive power and a third lens group having positive refractive power. When a state of lens group positions varies from a wide-angle end state to a telephoto end state, a distance between the first lens group and the second lens group increases, and a distance between the second lens group and the third lens group decreases. The first lens group is composed of, in order from the object, a front lens group G1a having positive refractive power and a rear lens group G1b having positive refractive power. The front lens group G1a is composed of at least one negative lens and at least one positive lens. The rear lens group G1b is composed of a single positive lens. Focusing from infinity to a close object is carried out by moving the rear lens group G1b to the object. The following conditional expression (2) is satisfied:

$$0.015 < \Delta/fT < 0.050 \qquad (2)$$

where fT denotes a focal length of the zoom len system in the telephoto end state, and Δ denotes a moving amount of the rear lens group G1b in the telephoto end state from a state focusing on infinity to a state focusing on a close object locating at the distance ten times of the focal length (fT) in the telephoto end state from the image plane.

With constructing the zoom lens system in this manner, the focusing lens can be light, and the moving amount for focusing can be reduced, so that it is advantageous for fast autofocus.

Conditional expression (2) defines an appropriate range of the moving amount of the rear lens group G1b for focusing. When the ratio Δ/fT is equal to or exceeds the upper limit of conditional expression (2), the moving amount for focusing becomes large, so that it becomes an obstacle to quick autofocus. On the other hand, when the ratio Δ/fT is equal to or falls below the lower limit of conditional expression (2), although the moving amount for focusing becomes small, the ratio of the moving amount of the focal plane to that of the rear lens group G1b becomes large. As a result, upon carrying out autofocus, higher accuracy is required for stopping a focusing lens, and fine adjustment has to be repeated, so that it becomes an obstacle to quick autofocus. In order to secure the effect of the present invention, it is preferable to set the upper limit of conditional expression (2) to 0.040. In order to secure the effect of the present invention, it is preferable to set the lower limit of conditional expression (2) to 0.020.

Each examples according to the embodiment of the present invention is explained below with reference to accompanying drawings.

EXAMPLE 1

FIG. 1 is a diagram showing a lens configuration of a zoom lens system according to Example 1 of the present invention. In FIG. 1, the zoom lens system according to Example 1 is composed of, in order from an object, a first lens group G1 having positive refractive power, a second lens group G2 having negative refractive power, an aperture stop S and a third lens group G3 having positive refractive power. When a state of lens group positions varies from a wide-angle end state W to a telephoto end state T, the first lens group G1 and the third lens group G3 are moved to the object, and the second lens group G2 is moved at first to an image and then to the object such that a distance between the first lens group G1 and the second lens group G2 increases, and a distance between the second lens group G2 and the third lens group G3 decreases. The aperture stop S is moved together with the third lens group G3 in a body.

The first lens group G1 is composed of, in order from the object, a front lens group G1a having positive refractive power and a rear lens group G1b having positive refractive power. Upon focusing from infinity to a close object, only the rear lens group G1b is moved to the object. The front lens group G1a is composed of a cemented lens constructed by, in order from the object, a negative meniscus lens having a convex surface facing the object cemented with a double convex positive lens. The rear lens group G1b is composed of a positive meniscus lens having a convex surface facing the object.

The second lens group G2 is composed of, in order from the object, a cemented lens constructed by a double concave negative lens cemented with a positive meniscus lens having a convex surface facing the object and a negative meniscus lens having a concave surface facing the object.

The third lens group G3 is composed of, in order from the object, a front lens group G3a of the third lens group G3 having positive refractive power, a middle lens group G3b of the third lens group G3 having negative refractive power and a rear lens group G3c of the third lens group G3 having positive refractive power. A camera shake can be corrected by moving the middle lens group G3b perpendicularly to the optical axis. The front lens group G3a is composed of, in order from the object, a double convex positive lens, a cemented lens constructed by a double convex positive lens cemented with a double concave negative lens, a positive meniscus lens having a convex surface facing the object and a positive meniscus lens having a concave surface facing the object. The middle lens group G3b is composed of a cemented lens constructed by, in order from the object, a double convex positive lens cemented with a double concave negative lens. The rear lens group G3c is composed of, in order from the object, a double convex positive lens and a negative meniscus lens having a concave surface facing the object.

In a zoom lens system having a focal length of f, a vibration reduction coefficient, which is a ratio of a moving amount of an image on the image plane to that of the moving lens group perpendicularly to the optical axis upon correcting a camera shake, of K, in order to correct rotational camera shake of an angle of θ, the moving lens group for correcting the camera shake may be moved by the amount of (f·tan θ)/K perpendicularly to the optical axis. The relation is the same in the other examples explained later, so the duplicated explanations are to be omitted.

In the wide-angle end state W in Example 1, the vibration reduction coefficient is 0.953, and the focal length is 56.10 (mm), so that the moving amount of the middle lens group G3b of the third lens group G3 for correcting a rotational camera shake of 0.30 degrees is 0.308 (mm). In the intermediate focal length state M, the vibration reduction coefficient is 1.084, and the focal length is 100.00 (mm), so that the moving amount of the middle lens group G3b of the third lens group G3 for correcting a rotational camera shake of 0.30 degrees is 0.483 (mm). In the telephoto end state T, the vibration reduction coefficient is 1.500, and the focal length is 196.00 (mm), so that the moving amount of the middle lens group G3b of the third lens group G3 for correcting a rotational camera shake of 0.30 degrees is 0.684 (mm).

Various values associated with Example 1 are listed in Table 1. In [Specifications], f denotes the focal length, FNO denotes the f-number, and 2ω denotes an angle of view. In [Lens Data], the left most column shows the lens surface number counted in order from the object side, the second column "r" shows a radius of curvature of the lens surface, the third column "d" shows a distance to the next lens surface, the fourth column "ν" shows Abbe number of the medium at d-line (wavelength λ=587.6 nm), and the fifth column "n" shows refractive index of the medium at d-line (wavelength λ=587.6 nm). In [Variable Distances], the focal length f or shooting magnification M, and variable distances are shown. By the way, D0 denotes a distance between the object and the first lens surface, and R denotes a distance between an object and the image plane I.

In the tables for various values, "mm" is generally used for the unit of length such as the focal length, the radius of curvature and the distance to the next lens surface. However, since an optical system proportionally enlarged or reduced its dimension can be obtained similar optical performance, the unit is not necessary to be limited to "mm", and any other suitable unit can be used.

The explanation of reference symbols is the same in the other examples, so that duplicated explanations are omitted.

TABLE 1

[Specifications]

| | W | M | T |
|---|---|---|---|
| f = | 56.10 | 100.00 | 196.00 |
| FNO = | 4.09 | 4.52 | 5.87 |
| 2ω = | 30.41 | 16.70 | 8.61° |

[Lens Data]

| | r | d | ν | n |
|---|---|---|---|---|
| 1 | 417.4993 | 2.0000 | 23.78 | 1.846660 |
| 2 | 133.3491 | 4.4536 | 82.52 | 1.497820 |
| 3 | −141.7114 | (d3) | | |
| 4 | 64.4520 | 4.0807 | 70.23 | 1.487490 |
| 5 | 2262.3455 | (d5) | | |
| 6 | −462.4291 | 1.2000 | 49.60 | 1.772499 |
| 7 | 17.9498 | 3.2808 | 23.78 | 1.846660 |
| 8 | 45.2562 | 2.8986 | | |
| 9 | −34.5394 | 1.2000 | 49.61 | 1.772499 |
| 10 | −1213.4241 | (d10) | | |
| 11 | ∞ | 1.4000 | Aperture Stop S | |
| 12 | 99.1963 | 3.9731 | 44.78 | 1.743997 |
| 13 | −48.2869 | 0.2000 | | |
| 14 | 38.2868 | 4.3528 | 82.52 | 1.497820 |
| 15 | −35.8183 | 1.2000 | 25.43 | 1.805181 |
| 16 | 240.5647 | 0.2000 | | |
| 17 | 20.8737 | 3.2567 | 70.41 | 1.487490 |
| 18 | 31.2716 | 6.8444 | | |
| 19 | −65.0908 | 1.8463 | 70.41 | 1.487490 |
| 20 | −40.2149 | 3.0001 | | |
| 21 | 196.1377 | 2.4039 | 25.42 | 1.805181 |
| 22 | −31.6590 | 1.1000 | 39.58 | 1.804398 |
| 23 | 36.1156 | 10.1524 | | |
| 24 | 47.4244 | 2.7602 | 41.17 | 1.701540 |
| 25 | −74.0896 | 1.5079 | | |
| 26 | −20.8104 | 1.1000 | 37.95 | 1.723420 |
| 27 | −58.1366 | (B.f.) | | |

[Variable Distances]

| | W | M | T |
|---|---|---|---|
| <upon focusing on infinity> | | | |
| f | 56.09995 | 100.00333 | 196.00132 |
| D0 | ∞ | ∞ | ∞ |
| d3 | 14.30036 | 14.30036 | 14.30036 |
| d5 | 2.13584 | 23.23393 | 33.53381 |
| d10 | 23.67293 | 14.49766 | 2.29982 |
| B.f. | 39.47951 | 46.66237 | 69.45455 |
| R | ∞ | ∞ | ∞ |
| <upon focusing on a close object> | | | |
| M | −0.03206 | −0.05778 | −0.11463 |
| D0 | 1816.0001 | 1796.8946 | 1776.0005 |
| d3 | 8.10214 | 8.03455 | 7.95893 |
| d5 | 8.33406 | 29.49974 | 39.87524 |
| d10 | 23.67293 | 14.49766 | 2.29982 |
| B.f. | 39.47951 | 46.66236 | 69.45455 |
| R | 1960.0000 | 1960.0000 | 1960.0000 |

[Values for Conditional Expressions]

(1): fT/f1b = 1.441
(2): Δ/fT = 0.0323
(3): ν1b = 70.23
(4): (r1bF + r1bR)/(r1bR − r1bF) = 1.059
(5): n1an − n1ap = 0.34884
(6): ν1ap − ν1an = 58.74

TABLE 1-continued

| (7): fT/f1 = | 1.955 |
| (8): fT/f2 = | -7.612 |
| (9): fT/f3 = | 6.098 |
| (10): fT/f3a = | 6.887 |
| (11): fT/f3b = | -3.521 |
| (12): fT/f3c = | 0.613 |

FIGS. 2A, 2B and 2C are graphs showing various aberrations of the zoom lens system according to Example 1 in a wide-angle end state in which FIG. 2A shows various aberrations upon focusing on infinity, FIG. 2B shows various aberrations upon focusing on a close object (1960 mm which is ten times of the focal length in the telephoto end state), and FIG. 2C shows coma when correcting rotational camera shake of 0.3 degrees upon focusing on infinity. FIGS. 3A, 3B and 3C are graphs showing various aberrations of the zoom lens system according to Example 1 in an intermediate focal length state in which FIG. 3A shows various aberrations upon focusing on infinity, FIG. 3B shows various aberrations upon focusing on a close object (1960 mm which is ten times of the focal length in the telephoto end state), and FIG. 3C shows coma when correcting rotational camera shake of 0.3 degrees upon focusing on infinity. FIGS. 4A, 4B and 4C are graphs showing various aberrations of the zoom lens system according to Example 1 in a telephoto end state in which FIG. 4A shows various aberrations upon focusing on infinity, FIG. 4B shows various aberrations upon focusing on a close object (1960 mm which is ten times of the focal length in the telephoto end state), and FIG. 4C shows coma when correcting rotational camera shake of 0.3 degrees upon focusing on infinity.

In respective graphs, FNO denotes an f-number, NA denotes a numerical aperture, Y denotes an image height, d denotes aberration curve at d-line (wavelength λ=587.6 nm), and g denotes aberration curve at g-line (wavelength λ=435.8 nm). In the graph showing astigmatism, a solid line indicates a sagittal image plane, and a broken line indicates a meridional image plane. The above-described explanation regarding various aberration graphs is the same as the other examples.

As is apparent from the respective graphs, the zoom lens system according to Example 1 shows superb optical performance as a result of good corrections to various aberrations in each focal length state from the wide-angle end state to the telephoto end state.

EXAMPLE 2

FIG. 5 is a diagram showing a lens configuration of a zoom lens system according to Example 2 of the present invention. In FIG. 5, the zoom lens system according to Example 2 is composed of, in order from an object, a first lens group G1 having positive refractive power, a second lens group G2 having negative refractive power, an aperture stop S and a third lens group G3 having positive refractive power. When a state of lens group positions varies from a wide-angle end state W to a telephoto end state T, the first lens group G1, the second lens group G2 and the third lens group G3 are moved to the object such that a distance between the first lens group G1 and the second lens group G2 increases, and a distance between the second lens group G2 and the third lens group G3 decreases. The aperture stop S is moved together with the third lens group G3 in a body.

The first lens group G1 is composed of, in order from the object, a front lens group G1a having positive refractive power and a rear lens group G1b having positive refractive power. Upon focusing from infinity to a close object, only the rear lens group G1b is moved to the object. The front lens group G1a is composed of a cemented lens constructed by, in order from the object, a negative meniscus lens having a convex surface facing the object cemented with a double convex positive lens. The rear lens group G1b is composed of a positive meniscus lens having a convex surface facing the object.

The second lens group G2 is composed of, in order from the object, a double concave negative lens, and a cemented lens constructed by a double concave negative lens cemented with a double convex positive lens.

The third lens group G3 is composed of, in order from the object, a front lens group G3a of the third lens group G3 having positive refractive power, a middle lens group G3b of the third lens group G3 having negative refractive power and a rear lens group G3c of the third lens group G3 having positive refractive power. A camera shake can be corrected by moving the middle lens group G3b perpendicularly to the optical axis. The front lens group G3a is composed of, in order from the object, a double convex positive lens, a cemented lens constructed by a double convex positive lens cemented with a negative meniscus lens having a concave surface facing the object, a positive meniscus lens having a convex surface facing the object, and a cemented lens constructed by a negative meniscus lens having a convex surface facing the object cemented with a double convex positive lens. The middle lens group G3b is composed of a cemented lens constructed by, in order from the object, a double convex positive lens cemented with a double concave negative lens. The rear lens group G3c is composed of, in order from the object, a double convex positive lens and a negative meniscus lens having a concave surface facing the object.

In the wide-angle end state W in Example 2, the vibration reduction coefficient is 1.082, and the focal length is 55.00 (mm), so that the moving amount of the middle lens group G3b of the third lens group G3 for correcting a rotational camera shake of 0.30 degrees is 0.266 (mm). In the intermediate focal length state M, the vibration reduction coefficient is 1.249, and the focal length is 99.90 (mm), so that the moving amount of the middle lens group G3b of the third lens group G3 for correcting a rotational camera shake of 0.30 degrees is 0.419 (mm). In the telephoto end state T, the vibration reduction coefficient is 1.665, and the focal length is 195.99 (mm), so that the moving amount of the middle lens group G3b of the third lens group G3 for correcting a rotational camera shake of 0.30 degrees is 0.616 (mm).

Various values associated with Example 2 are listed in Table 2.

TABLE 2

| [Specifications] | | | |
| --- | --- | --- | --- |
| | W | M | T |
| f = | 55.00 | 99.90 | 195.99 |
| FNO = | 4.12 | 4.60 | 5.79 |
| 2ω = | 31.11 | 16.78 | 8.62° |

| [Lens Data] | | | |
| --- | --- | --- | --- |
| | r | d | ν | n |
| 1 | 85.7087 | 2.0000 | 23.78 | 1.846660 |
| 2 | 57.5735 | 5.5745 | 82.52 | 1.497820 |
| 3 | -222.0109 | (d3) | | |

TABLE 2-continued

| | | | | |
|---|---|---|---|---|
| 4 | 63.6511 | 3.8390 | 70.23 | 1.487490 |
| 5 | 1451.7746 | (d5) | | |
| 6 | −118.8637 | 1.2000 | 49.60 | 1.772499 |
| 7 | 33.5785 | 3.2606 | | |
| 8 | −27.6308 | 1.2000 | 49.60 | 1.772499 |
| 9 | 27.4073 | 3.5535 | 23.78 | 1.846660 |
| 10 | −169.0460 | (d10) | | |
| 11 | ∞ | 1.4000 | Aperture Stop S | |
| 12 | 120.6398 | 3.2381 | 39.24 | 1.595509 |
| 13 | −49.3276 | 0.2000 | | |
| 14 | 66.1060 | 4.5917 | 82.52 | 1.497820 |
| 15 | −28.9658 | 1.2000 | 23.78 | 1.846660 |
| 16 | −67.2049 | 0.2000 | | |
| 17 | 21.0635 | 3.0894 | 39.24 | 1.595509 |
| 18 | 39.6345 | 7.5924 | | |
| 19 | 850.6075 | 1.1000 | 23.78 | 1.846660 |
| 20 | 34.7015 | 3.3055 | 70.41 | 1.487490 |
| 21 | −54.7399 | 3.0000 | | |
| 22 | 139.2837 | 2.6430 | 25.42 | 1.805181 |
| 23 | −32.2926 | 1.1000 | 39.57 | 1.804400 |
| 24 | 30.4890 | 7.6355 | | |
| 25 | 32.0587 | 3.2001 | 39.24 | 1.595509 |
| 26 | −107.8477 | 2.2346 | | |
| 27 | −18.0875 | 1.1000 | 49.61 | 1.772500 |
| 28 | −35.7802 | (B.f.) | | |

[Variable Distances]

| | W | M | T |
|---|---|---|---|
| <upon focusing on infinity> | | | |
| f | 55.00032 | 99.89578 | 195.98740 |
| D0 | ∞ | ∞ | ∞ |
| d3 | 10.30000 | 10.30000 | 10.30000 |
| d5 | 2.41860 | 18.43984 | 27.29969 |
| d10 | 18.99366 | 11.74207 | 2.00000 |
| B.f. | 40.83013 | 48.86015 | 68.82891 |
| R | ∞ | ∞ | ∞ |
| <upon focusing on a close object> | | | |
| M | −0.03097 | −0.05679 | −0.11265 |
| D0 | 1819.8737 | 1803.0740 | 1783.9875 |
| d3 | 5.91820 | 5.87710 | 5.82946 |
| d5 | 6.80040 | 22.86274 | 31.77023 |
| d10 | 18.99366 | 11.74207 | 2.00000 |
| B.f. | 40.83013 | 48.86015 | 68.82891 |
| R | 1959.8740 | 1959.8740 | 1959.8740 |

[Values for Conditional Expressions]

| | |
|---|---|
| (1): fT/f1b = | 1.437 |
| (2): Δ/fT = | 0.0228 |
| (3): ν1b = | 70.23 |
| (4): (r1bF + r1bR)/(r1bR − r1bF) = | 1.092 |
| (5): n1an − n1ap = | 0.34884 |
| (6): ν1ap − ν1an = | 58.74 |
| (7): fT/f1 = | 2.501 |
| (8): fT/f2 = | −9.999 |
| (9): fT/f3 = | 6.862 |
| (10): fT/f3a = | 7.294 |
| (11): fT/f3b = | −3.971 |
| (12): fT/f3c = | 0.958 |

Figure 6B:
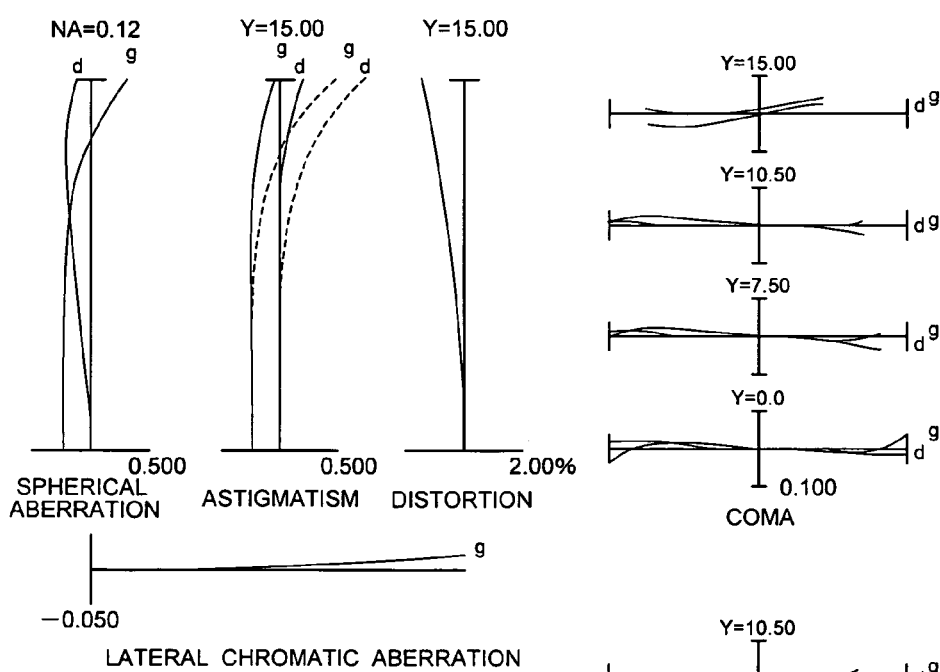
Figure 6C:
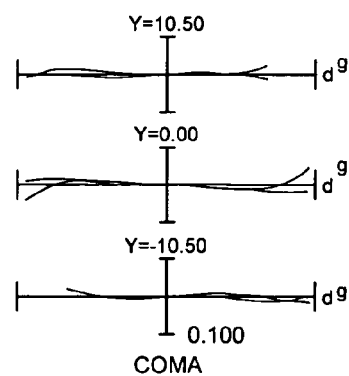
Figure 7A:
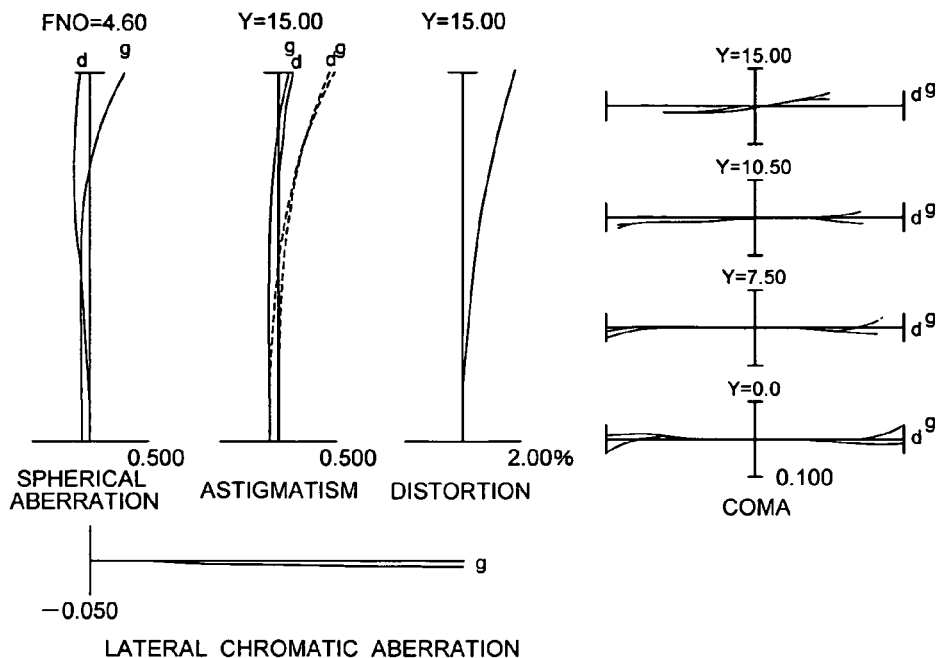
Figure 7B:
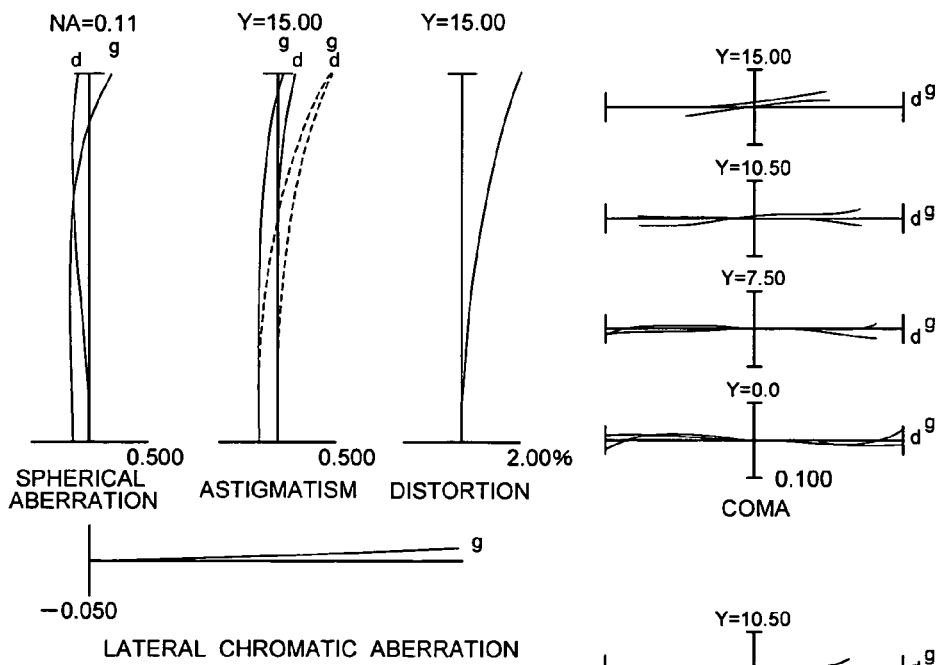
Figure 7C:
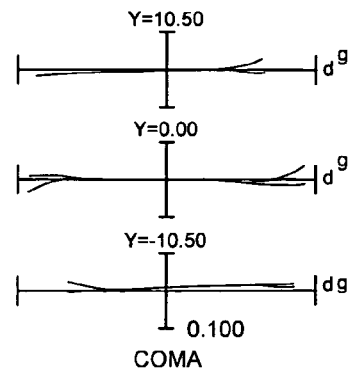

FIGS. 6A, 6B and 6C are graphs showing various aberrations of the zoom lens system according to Example 2 in a wide-angle end state in which FIG. 6A shows various aberrations upon focusing on infinity, FIG. 6B shows various aberrations upon focusing on a close object (1959.9 mm which is ten times of the focal length in the telephoto end state), and FIG. 6C shows coma when correcting rotational camera shake of 0.3 degrees upon focusing on infinity. FIGS. 7A, 7B and 7C are graphs showing various aberrations of the zoom lens system according to Example 2 in an intermediate focal length state in which FIG. 7A shows various aberrations upon focusing on infinity, FIG. 7B shows various aberrations upon focusing on a close object (1959.9 mm which is ten times of the focal length in the telephoto end state), and FIG. 7C shows coma when correcting rotational camera shake of 0.3 degrees upon focusing on infinity. FIGS. 8A, 8B and 8C are graphs showing various aberrations of the zoom lens system according to Example 2 in a telephoto end state in which FIG. 8A shows various aberrations upon focusing on infinity, FIG. 8B shows various aberrations upon focusing on a close object (1959.9 mm which is ten times of the focal length in the telephoto end state), and FIG. 8C shows coma when correcting rotational camera shake of 0.3 degrees upon focusing on infinity.

As is apparent from the respective graphs, the zoom lens system according to Example 2 shows superb optical performance as a result of good corrections to various aberrations in each focal length state from the wide-angle end state to the telephoto end state.

EXAMPLE 3

FIG. 9 is a diagram showing a lens configuration of a zoom lens system according to Example 3 of the present invention. In FIG. 9, the zoom lens system according to Example 3 is composed of, in order from an object, a first lens group G1 having positive refractive power, a second lens group G2 having negative refractive power, an aperture stop S and a third lens group G3 having positive refractive power. When a state of lens group positions varies from a wide-angle end state W to a telephoto end state T, the first lens group G1 and the third lens group G3 are moved to the object, and the second lens group G2 is moved at first to an image and then to the object such that a distance between the first lens group G1 and the second lens group G2 increases, and a distance between the second lens group G2 and the third lens group G3 decreases. The aperture stop S is moved together with the third lens group G3 in a body.

The first lens group G1 is composed of, in order from the object, a front lens group G1a having positive refractive power and a rear lens group G1b having positive refractive power. Upon focusing from infinity to a close object, only the rear lens group G1b is moved to the object. The front lens group G1a is composed of a cemented lens constructed by, in order from the object, a negative meniscus lens having a convex surface facing the object cemented with a double convex positive lens. The rear lens group G1b is composed of a double convex positive lens.

The second lens group G2 is composed of, in order from the object, a cemented lens constructed by a double convex positive lens cemented with a double concave negative lens, and a negative meniscus lens having a concave surface facing the object.

The third lens group G3 is composed of, in order from the object, a front lens group G3a of the third lens group G3 having positive refractive power, a middle lens group G3b of the third lens group G3 having negative refractive power, and a rear lens group G3c of the third lens group G3 having positive refractive power. A camera shake can be corrected by moving the middle lens group G3b perpendicularly to the optical axis. The front lens group G3a is composed of, in order from the object, a positive meniscus lens having a concave surface facing the object, a cemented lens constructed by a double convex positive lens cemented with a negative meniscus lens having a concave surface facing the object, a positive meniscus lens having a convex surface facing the object, and a cemented lens constructed by a negative meniscus lens having a convex surface facing the object cemented with a double convex positive lens. The middle lens group G3b is composed of a cemented lens constructed by, in order from the object, a double convex positive lens cemented with a double concave negative lens. The rear lens group G3c is composed of, in order from the object, a double convex positive lens and a negative meniscus lens having a concave surface facing the object.

In the wide-angle end state W in Example 3, the vibration reduction coefficient is 1.190, and the focal length is 56.10 (mm), so that the moving amount of the middle lens group G3b of the third lens group G3 for correcting a rotational camera shake of 0.30 degrees is 0.247 (mm). In the intermediate focal length state M, the vibration reduction coefficient is 1.234, and the focal length is 99.88 (mm), so that the moving amount of the middle lens group G3b of the third lens group G3 for correcting a rotational camera shake of 0.30 degrees is 0.424 (mm). In the telephoto end state T, the vibration reduction coefficient is 1.636, and the focal length is 195.96 (mm), so that the moving amount of the middle lens group G3b of the third lens group G3 for correcting a rotational camera shake of 0.30 degrees is 0.627 (mm).

Various values associated with Example 3 are listed in Table 3.

TABLE 3

[Specifications]

|   | W | M | T |
|---|---|---|---|
| f = | 56.10 | 99.88 | 195.96 |
| FNO = | 4.40 | 4.54 | 5.77 |
| 2ω = | 30.64 | 16.75 | 8.60° |

[Lens Data]

|   | r | d | ν | n |
|---|---|---|---|---|
| 1 | 75.9323 | 2.0000 | 23.78 | 1.846660 |
| 2 | 52.1610 | 5.6701 | 82.52 | 1.497820 |
| 3 | −1044.7209 | (d3) | | |
| 4 | 66.1595 | 5.1272 | 70.23 | 1.487490 |
| 5 | −753.2747 | (d5) | | |
| 6 | 1816.6242 | 3.2694 | 23.78 | 1.846660 |
| 7 | −22.9286 | 1.2000 | 49.60 | 1.772499 |
| 8 | 31.7893 | 3.1628 | | |
| 9 | −23.2880 | 1.2000 | 49.60 | 1.772499 |
| 10 | −206.7476 | (d10) | | |
| 11 | ∞ | 1.4000 | Aperture Stop S | |
| 12 | −587.4114 | 3.2398 | 39.24 | 1.595509 |
| 13 | −55.1914 | 0.2000 | | |
| 14 | 51.7471 | 5.1836 | 82.52 | 1.497820 |
| 15 | −23.3978 | 1.2000 | 23.78 | 1.846660 |
| 16 | −45.6612 | 0.2000 | | |
| 17 | 21.2218 | 3.2429 | 39.24 | 1.595509 |
| 18 | 46.1602 | 4.2112 | | |
| 19 | 132.9859 | 1.1000 | 23.78 | 1.846660 |
| 20 | 38.8287 | 3.3240 | 70.41 | 1.487490 |
| 21 | −63.9525 | 3.0000 | | |
| 22 | 144.7819 | 2.7288 | 25.42 | 1.805181 |
| 23 | −30.6709 | 1.1000 | 39.58 | 1.804398 |
| 24 | 29.8104 | 7.6837 | | |
| 25 | 35.9832 | 2.8689 | 39.24 | 1.595509 |
| 26 | −138.6427 | 2.4904 | | |
| 27 | −16.0977 | 1.1000 | 49.61 | 1.772499 |
| 28 | −28.2521 | (B.f.) | | |

[Variable Distances]

|   | W | M | T |
|---|---|---|---|
| <upon focusing on infinity> | | | |
| f | 56.10012 | 99.88498 | 195.96242 |
| D0 | ∞ | ∞ | ∞ |
| d3 | 10.30000 | 10.30000 | 10.30000 |
| d5 | 2.00000 | 20.81931 | 28.65154 |

TABLE 3-continued

|   |   |   |   |
|---|---|---|---|
| d10 | 18.93291 | 12.39704 | 2.00000 |
| B.f. | 42.85206 | 44.85861 | 63.13186 |
| R | ∞ | ∞ | ∞ |
| <upon focusing on a close object> | | | |
| M | −0.03167 | −0.05685 | −0.11255 |
| D0 | 1819.6322 | 1805.3422 | 1789.6338 |
| d3 | 5.94183 | 5.90692 | 5.86789 |
| d5 | 6.35817 | 25.21239 | 33.08365 |
| d10 | 18.93291 | 12.39704 | 2.00000 |
| B.f. | 42.85206 | 44.85861 | 63.13186 |
| R | 1959.6200 | 1959.6200 | 1959.6200 |

[Values for Conditional Expressions]

| (1): fT/f1b = | 1.568 |
|---|---|
| (2): Δ/fT = | 0.0226 |
| (3): ν1b = | 70.23 |
| (4): (r1bF + r1bR)/(r1bR − r1bF) = | 0.839 |
| (5): n1an − n1ap = | 0.34884 |
| (6): ν1ap − ν1an = | 58.74 |
| (7): fT/f1 = | 2.420 |
| (8): fT/f2 = | −10.117 |
| (9): fT/f3 = | 7.041 |
| (10): fT/f3a = | 7.959 |
| (11): fT/f3b = | −4.131 |
| (12): fT/f3c = | 0.421 |

Figure 10A:
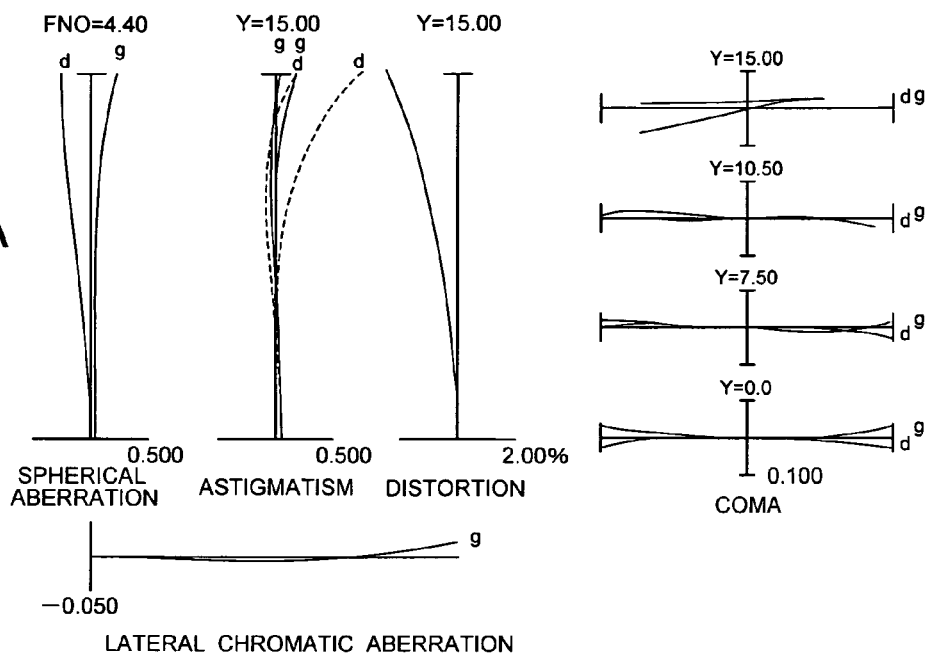
Figure 10B:
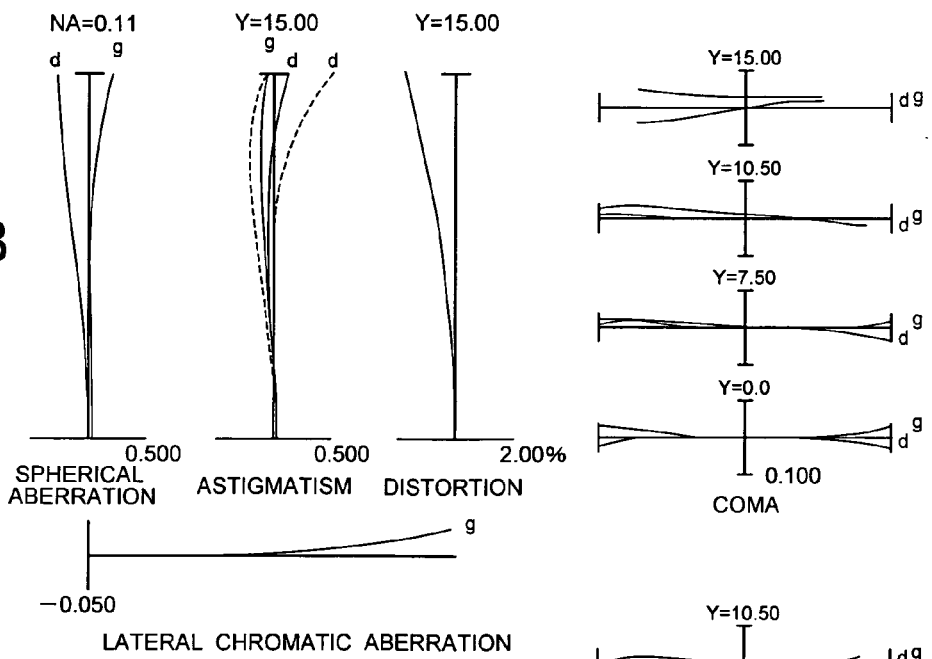
Figure 10C:
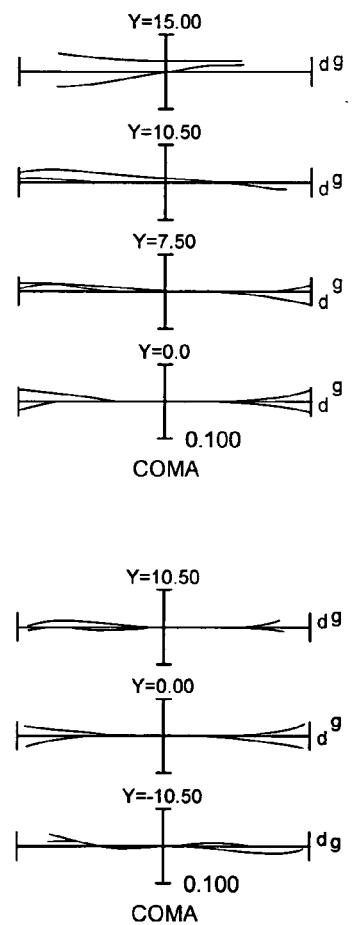
Figure 11A:
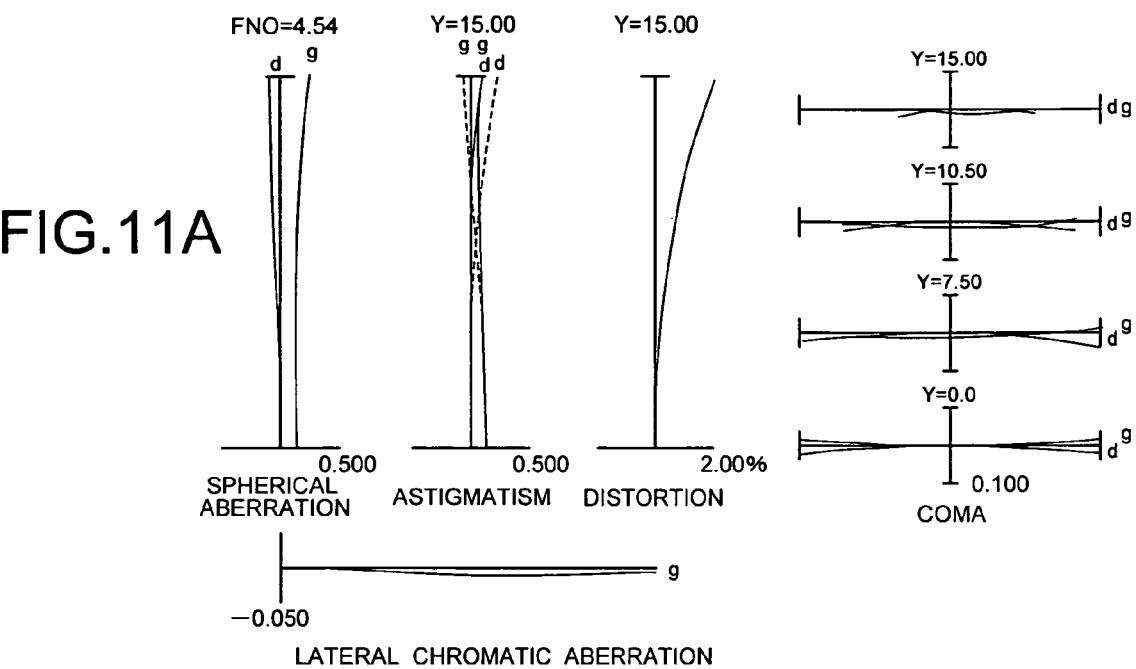
Figure 11B:
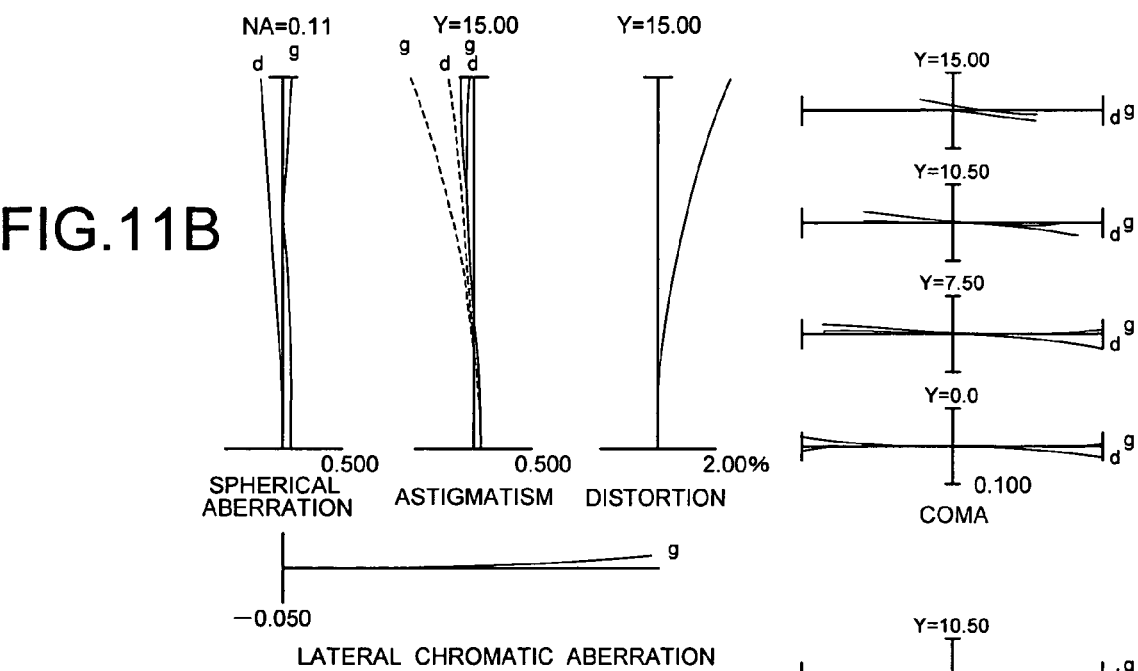
Figure 11C:
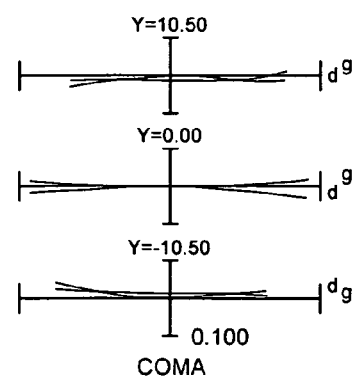
Figure 12A:
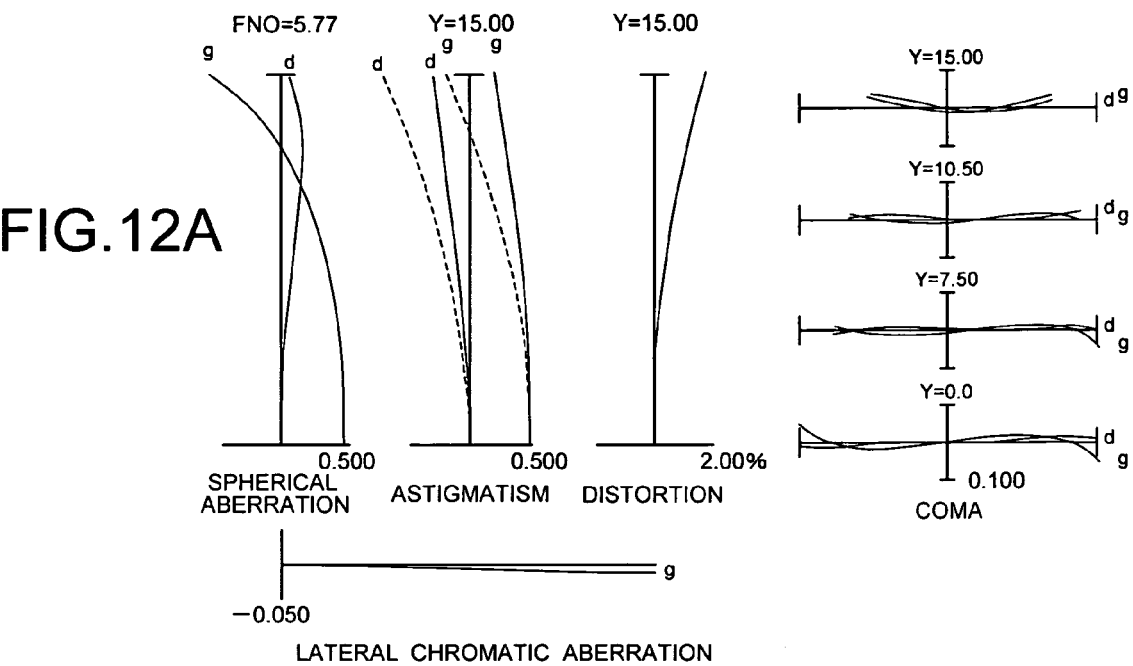
Figure 12B:
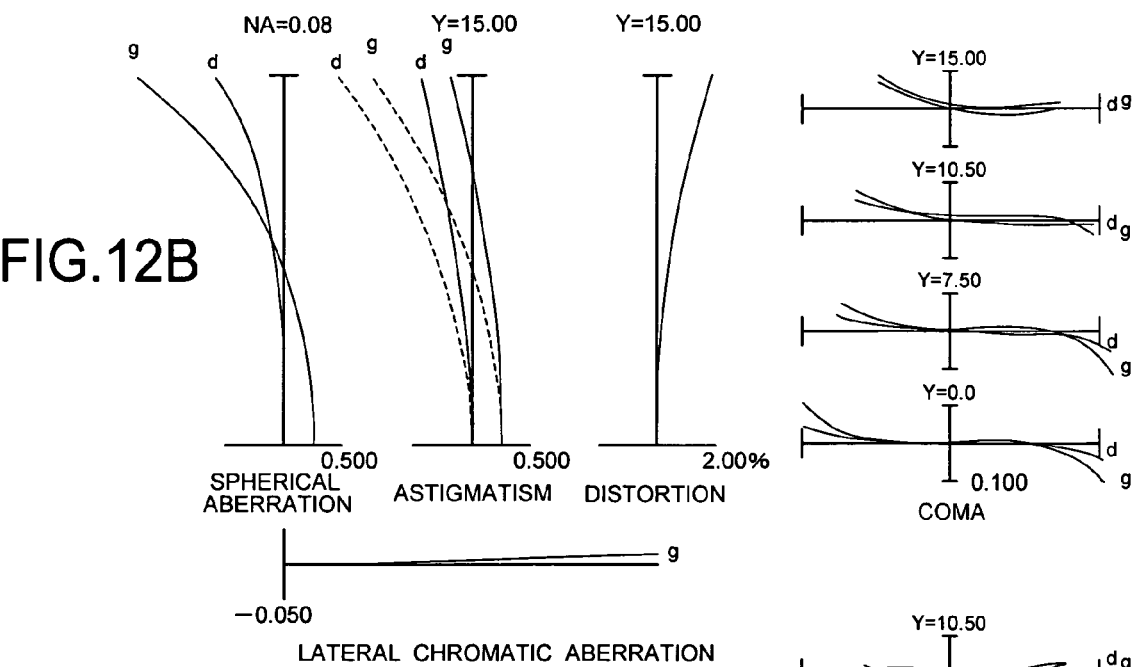
Figure 12C:
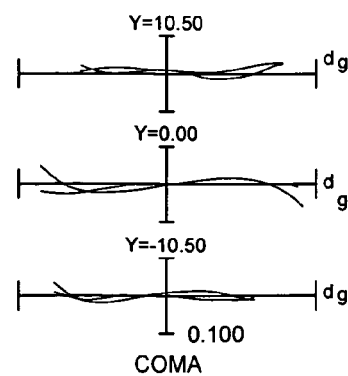

FIGS. 10A, 10B and 10C are graphs showing various aberrations of the zoom lens system according to Example 3 in a wide-angle end state in which FIG. 10A shows various aberrations upon focusing on infinity, FIG. 10B shows various aberrations upon focusing on a close object (1959.6 mm which is ten times of the focal length in the telephoto end state), and FIG. 10C shows coma when correcting rotational camera shake of 0.3 degrees upon focusing on infinity. FIGS. 11A, 11B and 11C are graphs showing various aberrations of the zoom lens system according to Example 3 in an intermediate focal length state in which FIG. 11A shows various aberrations upon focusing on infinity, FIG. 11B shows various aberrations upon focusing on a close object (1959.6 mm which is ten times of the focal length in the telephoto end state), and FIG. 11C shows coma when correcting rotational camera shake of 0.3 degrees upon focusing on infinity. FIGS. 12A, 12B and 12C are graphs showing various aberrations of the zoom lens system according to Example 3 in a telephoto end state in which FIG. 12A shows various aberrations upon focusing on infinity, FIG. 12B shows various aberrations upon focusing on a close object (1959.6 mm which is ten times of the focal length in the telephoto end state), and FIG. 12C shows coma when correcting rotational camera shake of 0.3 degrees upon focusing on infinity.

As is apparent from the respective graphs, the zoom lens system according to Example 3 shows superb optical performance as a result of good corrections to various aberrations in each focal length state from the wide-angle end state to the telephoto end state.

EXAMPLE 4

IG. 13 is a diagram showing a lens configuration of a zoom lens system according to Example 4 of the present invention. In FIG. 13, the zoom lens system according to Example 4 is composed of, in order from an object, a first lens group G1 having positive refractive power, a second lens group G2 having negative refractive power, an aperture stop S and a third lens group G3 having positive refractive power. When a state of lens group positions varies from a wide-angle end state W to a telephoto end state T, the first lens group G1 and the third lens group G3 are moved to the object, and the second lens group G2 is moved at first to an image and then to the object such that a distance between the first lens group G1 and the second lens group G2 increases, and a distance between the second lens group G2 and the third lens group G3 decreases. The aperture stop S is moved together with the third lens group G3 in a body.

The first lens group G1 is composed of, in order from the object, a front lens group G1a having positive refractive power and a rear lens group G1b having positive refractive power. Upon focusing from infinity to a close object, only the rear lens group G1b is moved to the object. The front lens group G1a is composed of a cemented lens constructed by, in order from the object, a negative meniscus lens having a convex surface facing the object cemented with a double convex positive lens. The rear lens group G1b is composed of a positive meniscus lens having a convex surface facing the object.

The second lens group G2 is composed of, in order from the object, a cemented lens constructed by a double concave negative lens cemented with a positive meniscus lens having a convex surface facing the object, and a double concave negative lens.

The third lens group G3 is composed of, in order from the object, a front lens group G3a of the third lens group G3 having positive refractive power, a middle lens group G3b of the third lens group G3 having negative refractive power, and a rear lens group G3c of the third lens group G3 having positive refractive power. A camera shake can be corrected by moving the middle lens group G3b perpendicularly to the optical axis. The front lens group G3a is composed of, in order from the object, a double convex positive lens, a cemented lens constructed by a double convex positive lens cemented with a double concave negative lens, a positive meniscus lens having a convex surface facing the object, and a positive meniscus lens having a concave surface facing the object. The middle lens group G3b is composed of a cemented lens constructed by, in order from the object, a double convex positive lens cemented with a double concave negative lens. The rear lens group G3c is composed of, in order from the object, a double convex positive lens and a negative meniscus lens having a concave surface facing the object.

In the wide-angle end state W in Example 4, the vibration reduction coefficient is 0.952, and the focal length is 55.00 (mm), so that the moving amount of the middle lens group G3b of the third lens group G3 for correcting a rotational camera shake of 0.30 degrees is 0.303 (mm). In the intermediate focal length state M, the vibration reduction coefficient is 1.079, and the focal length is 100.10 (mm), so that the moving amount of the middle lens group G3b of the third lens group G3 for correcting a rotational camera shake of 0.30 degrees is 0.486 (mm). In the telephoto end state T, the vibration reduction coefficient is 1.500, and the focal length is 196.00 (mm), so that the moving amount of the middle lens group G3b of the third lens group G3 for correcting a rotational camera shake of 0.30 degrees is 0.684 (mm).

Various values associated with Example 4 are listed in Table 4.

TABLE 4

[Specifications]

|   | W | M | T |
|---|---|---|---|
| f = | 55.00 | 100.10 | 196.00 |
| FNO = | 4.12 | 4.54 | 5.91 |
| 2ω = | 31.08 | 16.70 | 8.62° |

TABLE 4-continued

[Lens Data]

|   | r | d | ν | n |
|---|---|---|---|---|
| 1 | 308.4134 | 2.0000 | 23.78 | 1.846660 |
| 2 | 106.2789 | 4.6315 | 82.52 | 1.497820 |
| 3 | −126.8152 | (d3) |   |   |
| 4 | 53.1668 | 4.2221 | 70.23 | 1.487490 |
| 5 | 1871.9288 | (d5) |   |   |
| 6 | −546.3334 | 1.2000 | 49.60 | 1.772499 |
| 7 | 16.4234 | 3.4716 | 23.78 | 1.846660 |
| 8 | 39.8409 | 3.1014 |   |   |
| 9 | −32.6699 | 1.2000 | 49.61 | 1.772499 |
| 10 | 2314.4234 | (d10) |   |   |
| 11 | ∞ | 1.4000 | Aperture Stop S | |
| 12 | 84.7022 | 3.2501 | 44.78 | 1.743997 |
| 13 | −48.5064 | 0.2000 |   |   |
| 14 | 36.9013 | 4.5791 | 82.52 | 1.497820 |
| 15 | −34.5264 | 1.2000 | 25.43 | 1.805181 |
| 16 | 241.1237 | 0.2000 |   |   |
| 17 | 21.7937 | 2.3239 | 70.41 | 1.487490 |
| 18 | 31.3640 | 7.4049 |   |   |
| 19 | −70.1682 | 1.8928 | 70.41 | 1.487490 |
| 20 | −39.7784 | 3.0027 |   |   |
| 21 | 225.1880 | 2.3992 | 25.42 | 1.805181 |
| 22 | −31.0187 | 1.1000 | 39.58 | 1.804398 |
| 23 | 36.9108 | 10.1647 |   |   |
| 24 | 49.6909 | 3.1938 | 41.17 | 1.701540 |
| 25 | −79.7645 | 1.5415 |   |   |
| 26 | −20.9480 | 1.1000 | 37.95 | 1.723420 |
| 27 | −52.3428 | (B.f.) |   |   |

[Variable Distances]

|   | W | M | T |
|---|---|---|---|
| <upon focusing on infinity> | | | |
| f | 55.00443 | 100.09991 | 195.99970 |
| D0 | ∞ | ∞ | ∞ |
| d3 | 10.30017 | 10.30017 | 10.30017 |
| d5 | 2.12646 | 19.42252 | 27.17963 |
| d10 | 23.79408 | 14.24844 | 2.02018 |
| B.f. | 38.99995 | 45.96637 | 68.99985 |
| R | ∞ | ∞ | ∞ |
| <upon focusing on a close object> | | | |
| M | −0.03117 | −0.05720 | −0.11321 |
| D0 | 1820.0001 | 1805.2833 | 1786.7210 |
| d3 | 6.06227 | 6.02699 | 5.98163 |
| d5 | 6.36436 | 23.69570 | 31.49817 |
| d10 | 23.79408 | 14.24844 | 2.02018 |
| B.f. | 38.99995 | 45.96637 | 68.99985 |
| R | 1960.0000 | 1960.0000 | 1960.0000 |

[Values for Conditional Expressions]

| (1): fT/f1b = | 1.747 |
|---|---|
| (2): Δ/fT = | 0.0220 |
| (3): ν1b = | 70.23 |
| (4): (r1bF + r1bR)/(r1bR − r1bF) = | 1.058 |
| (5): n1an − n1ap = | 0.34884 |
| (6): ν1ap − ν1an = | 58.74 |
| (7): fT/f1 = | 2.350 |
| (8): fT/f2 = | −8.478 |
| (9): fT/f3 = | 6.216 |
| (10): fT/f3a = | 6.995 |
| (11): fT/f3b = | −3.536 |
| (12): fT/f3c = | 0.652 |

Figure 14A:
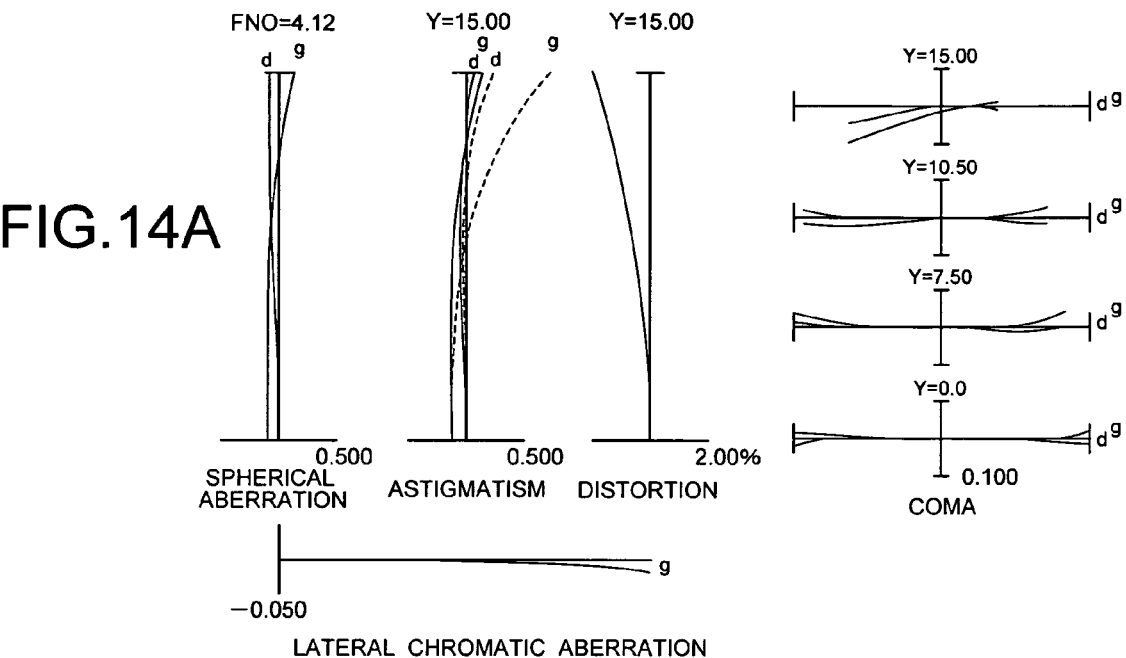
Figure 14B:
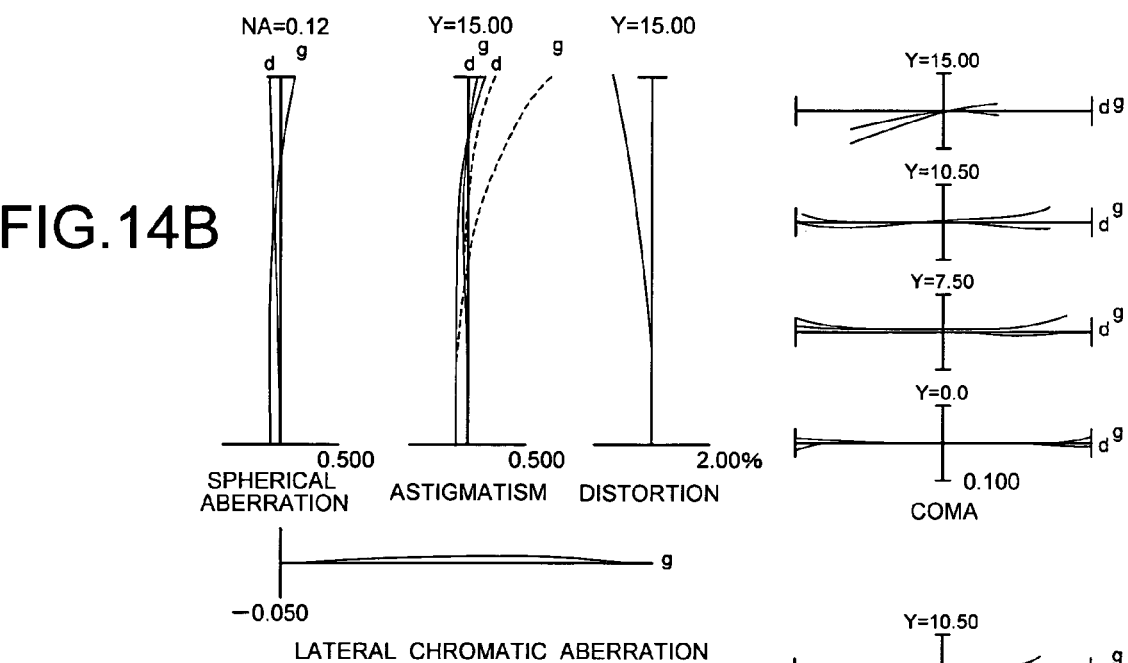
Figure 14C:
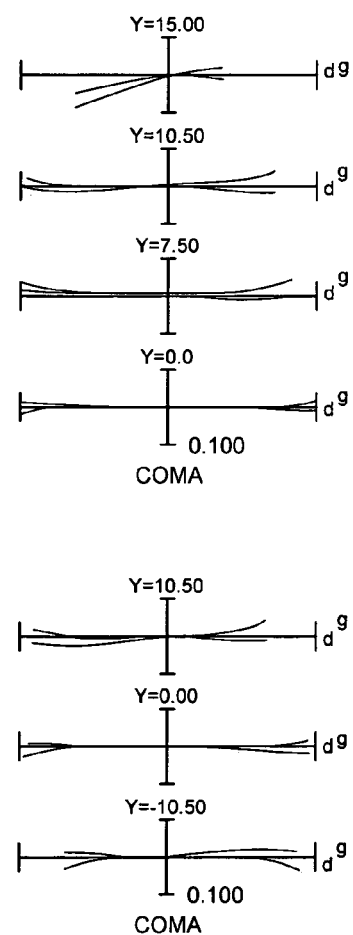
Figure 15A:
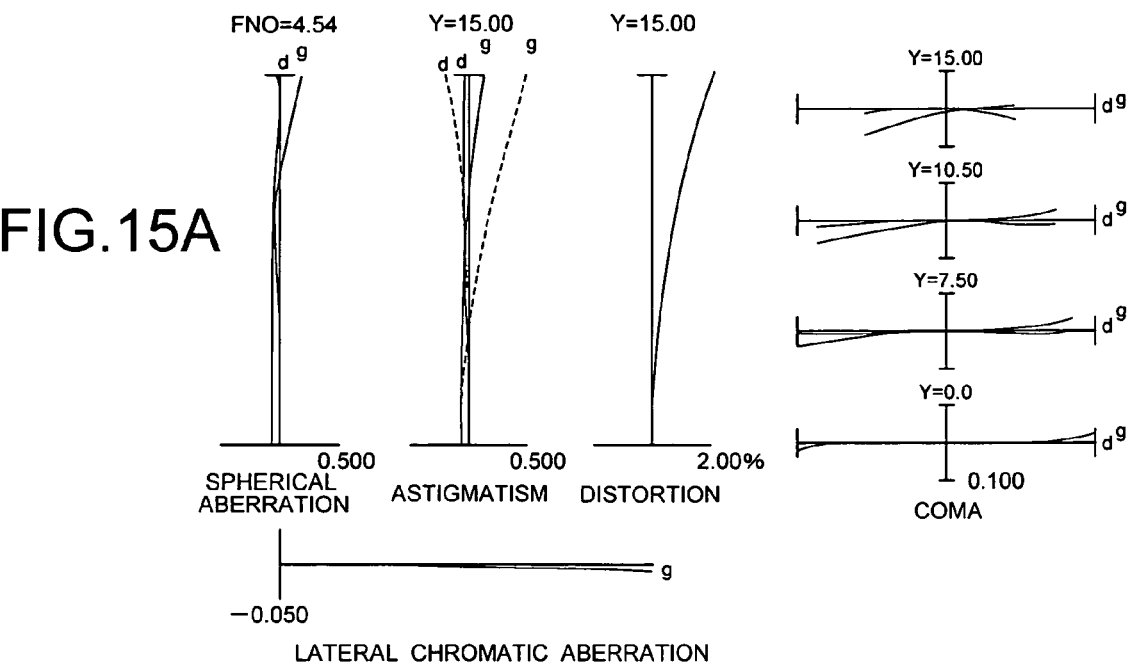
Figure 15B:
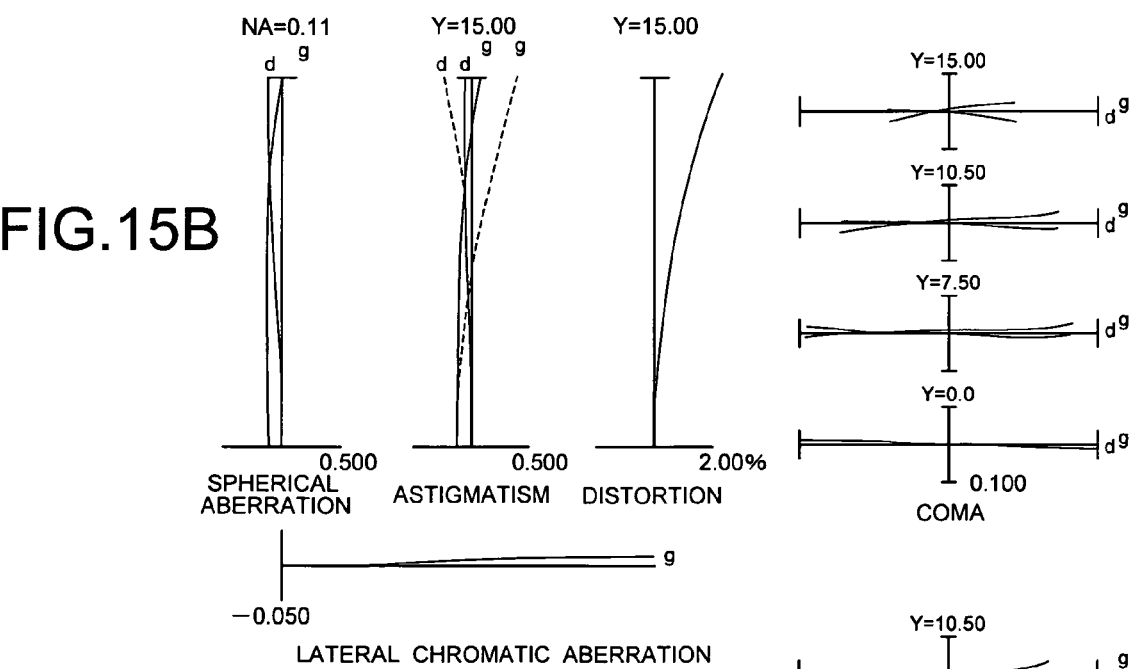
Figure 15C:
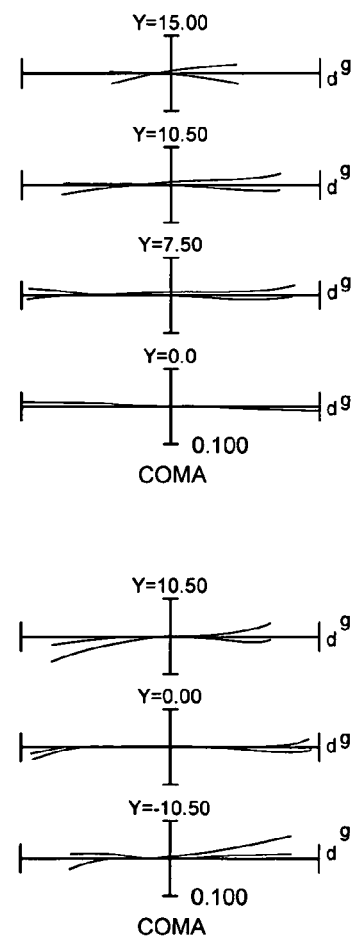

FIGS. 14A, 14B and 14C are graphs showing various aberrations of the zoom lens system according to Example 4 in a wide-angle end state in which FIG. 14A shows various aberrations upon focusing on infinity, FIG. 14B shows various aberrations upon focusing on a close object (1960 mm which is ten times of the focal length in the telephoto end state), and FIG. 14C shows coma when correcting rotational camera shake of 0.3 degrees upon focusing on infinity. FIGS. 15A, 15B and 15C are graphs showing various aberrations of the zoom lens system according to Example 4 in an intermediate focal length state in which FIG. 15A shows various aberrations upon focusing on infinity, FIG. 15B shows various aberrations upon focusing on a close object (1960 mm which is ten times of the focal length in the telephoto end state), and FIG. 15C shows coma when correcting rotational camera shake of 0.3 degrees upon focusing on infinity. FIGS. 16A, 16B and 16C are graphs showing various aberrations of the zoom lens system according to Example 4 in a telephoto end state in which FIG. 16A shows various aberrations upon focusing on infinity, FIG. 16B shows various aberrations upon focusing on a close object (1960 mm which is ten times of the focal length in the telephoto end state), and FIG. 16C shows coma when correcting rotational camera shake of 0.3 degrees upon focusing on infinity.

As is apparent from the respective graphs, the zoom lens system according to Example 4 shows superb optical performance as a result of good corrections to various aberrations in each focal length state from the wide-angle end state to the telephoto end state.

As described above, the present invention makes it possible to provide an internal focusing zoom lens system carrying out focusing by moving a portion of the first lens group, capable of simplifying the construction of the first lens group, lowering the price and being miniaturized, suitable for an autofocus single-lens reflex camera using a photographic film or a solid-state imaging device.

Incidentally, it is needless to say that although zoom lens systems with a three-lens-group configuration are shown as respective examples of the present invention, a zoom lens system simply added by a lens group to the three-lens-group configuration is included in the spirit or scope of the present invention. Moreover, in the configuration of each lens group, a lens group simply added by lens elements to the lens group shown in examples is included in the spirit or scope of the present invention.

Focusing from infinity to a close object may be carried out by moving a portion of a lens group, a lens group or a plurality of lens groups along the optical axis. The focusing lens group (s) may be used for auto focus, and applicable for being driven by a motor such as an ultrasonic motor. In particular, it is preferable that the rear lens group of the first lens group is a focusing lens group.

Any one of lens surface may be formed as an aspherical surface. The aspherical surface may be fabricated by a fine grinding process, a glass molding process that a glass material is formed into an aspherical shape by a mold, or a compound type process that a resin material is formed into an aspherical shape on a glass surface.

In each lens surface, an antireflection coating having high transmittance over a broad wavelength range may be applied to reduce flare or ghost images, so that high optical performance with a high contrast can be attained.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. The zoom lens system comprising, in order from an object:

a first lens group having positive refractive power;

a second lens group having negative refractive power; and a third lens group having positive refractive power, wherein when a state of lens group positions varies from a wide-angle end state to a telephoto end state, at least the first lens group and the third lens group are moved such that a distance between the first lens group and the second lens group increases, and a distance between the second lens group and the third lens group decreases.

the first lens group comprises, in order from the object, a front lens group having positive refractive power and a rear lens group having positive refractive power, the front lens group comprises, in order from the object, at least one negative lens and at least one positive lens, the rear lens group consists of a single positive lens, and focusing from infinity to a close object is carried out by moving the rear lens group toward the object.

2. The zoom lens system according to claim 1, wherein the following conditional expression is satisfied:

$$1.1 < fT/f1b < 2.0$$

where fT denotes a focal length of the zoom lens system in the telephoto end state, and f1$b$ denotes a focal length of the rear lens group.

3. The zoom lens system according to claim 2, wherein the following conditional expression is satisfied:

$$0.015 < \Delta/fT < 0.050$$

where fT denotes a focal length of the zoom lens system in the telephoto end state, and $\Delta$ denotes a moving amount of the rear lens group in the telephoto end state from a state focusing on infinity to a state focusing on a close object locating at the distance of ten times of the focal length (fT) in the telephoto end state from the image plane.

4. The zoom lens system according to claim 1, wherein when a state of lens group positions varies from the wide-angle end state to the telephoto end state, the first lens group is moved toward the object.

5. The zoom lens system according to claim 1, wherein when a state of lens group positions varies from the wide-angle end state to the telephoto end state, the third lens group is moved toward the object.

6. The zoom lens system according to claim 2, wherein when a state of lens group positions varies from the wide-angle end state to the telephoto end state, the second lens group is moved.

7. The zoom lens system according to claim 6, wherein when a state of lens group positions varies from the wide-angle end state to the telephoto end state, the second lens group is moved at first toward an image and then toward the object.

8. The zoom lens system according to claim 2, wherein the positive lens in the rear lens group has a convex surface facing the object, and the following conditional expressions are satisfied:

$$62 < v1b$$

$$0.5 < (r1bF + r1bR)/(r1bR - r1bF) < 2.0$$

where v1$b$ denotes Abbe number of the positive lens in the rear lens group at d-line ($\lambda$=587.6 nm), r1$b$F denotes a radius of curvature of the object side surface of the positive lens in the rear lens group, and r1$b$R denotes a radius of curvature of the image side surface of the positive lens in the rear lens group.

9. The zoom lens system according to claim 1, wherein the front lens group comprises, in order from the object, a negative meniscus lens having a convex surface facing the object, and a double convex positive lens, and wherein the following conditional expressions are satisfied:

$$0.20 < n1an - n1ap$$

$$30 < \nu1ap - \nu1an$$

where n1*an* denotes refractive index of the negative meniscus lens in the front lens group at d-line (λ=587.6 nm), n1*ap* denotes refractive index of the double convex positive lens in the front lens group at d-line, ν1*ap* denotes Abbe number of the double convex positive lens in the front lens group at d-line, and ν1*an* denotes Abbe number of the negative meniscus lens in the front lens group at d-line.

10. The zoom lens system according to claim 9, wherein the negative meniscus lens and the double convex positive lens in the front lens group are cemented with each other.

11. The zoom lens system according to claim 1, wherein the following conditional expression is satisfied:

$$1.5 < fT/f1 < 3.0$$

where fT denotes a focal length of the zoom lens system in the telephoto end state, and f1 denotes a focal length of the first lens group upon focusing infinity.

12. The zoom lens system according to claim 1, wherein the following conditional expression is satisfied:

$$-13.0 < fT/f2 < -5.0$$

where fT denotes a focal length of the zoom lens system in the telephoto end state, and f2 denotes a focal length of the second lens group.

13. The zoom lens system according to claim 1, wherein the following conditional expression is satisfied:

$$3.0 < fT/f3 < 9.0$$

where fT denotes a focal length of the zoom lens system in the telephoto end state, and f3 denotes a focal length of the third lens group.

14. The zoom lens system according to claim 1, wherein the second lens group comprises two negative lenses and a positive lens, and one of the two negative lenses and the positive lens are cemented with each other.

15. The zoom lens system comprising, in order from an object:
a first lens group having positive refractive power;
a second lens group having negative refractive power; and
a third lens group having positive refractive power;
wherein when a state of lens group positions varies from a wide-angle end state to a telephoto end state, a distance between the first lens group and the second lens group increases, and a distance between the second lens group and the third lens group decreases,
the first lens group comprises, in order from the object, a front lens group having positive refractive power and a rear lens group having positive refractive power,
the front lens group comprises, in order from the object, at least one negative lens and at least one positive lens,
the rear lens group consists of a single positive lens,
focusing from infinity to a close object is carried out by moving the rear lens group toward the object,
the third lens group comprises, in order from the object, a front lens group of the third lens group having positive refractive power, a middle lens group of the third lens group having negative refractive power, and a rear lens group of the third lens group, and
a camera shake is corrected by moving only the middle lens group of the third lens group perpendicularly to the optical axis.

16. The zoom lens system according to claim 15, wherein the following conditional expressions are satisfied:

$$4.0 < ft/f3a < 10.0$$

$$-5.0 < fT/f3b < -2.0$$

$$-1.0 < fT/f3c < 2.0$$

where fT denotes a focal length of the zoom lens system in the telephoto end state, f3*a* denotes a focal length of the front lens group of the third lens group, f3*b* denotes a focal length of the middle lens group of the third lens group, and f3*c* denotes a focal length of the rear lens group of the third lens group.

17. The zoom lens system comprising, in order from an object:
a first lens group having positive refractive power;
a second lens group having negative refractive power; and
a third lens group having positive refractive power,
wherein when a state of lens group positions varies from a wide-angle end state to a telephoto end state, a distance between the first lens group and the second lens group increases, and a distance between the second lens group and the third lens group decreases,
the first lens group comprises, in order from the object, a front lens group having positive refractive power and a rear lens group having positive refractive power,
the front lens group comprises, in order from the object, at least one negative lens and at least one positive lens,
the rear lens group consists of a single positive lens,
focusing from infinity to a close object is carried out by moving the rear lens group toward the object, and
the following conditional expression is satisfied:

$$1.1 < fT/f1b < 2.0$$

where fT denotes a focal length of the zoom lens system in the telephoto end state, and f1*b* denotes a focal length of the rear lens group.

18. The zoom lens system comprising, in order from an object:
a first lens group having positive refractive power;
a second lens group having negative refractive power; and
a third lens group having positive refractive power,
wherein when a state of lens group positions varies from a wide-angle end state to a telephoto end state, a distance between the first lens group and the second lens group increases, and a distance between the second lens group and the third lens group decreases,
the first lens group comprises, in order from the object, a front lens group having positive refractive power and a rear lens group having positive refractive power,
the front lens group comprises, in order from the object, at least one negative lens and at least one positive lens,
the rear lens group consists of a single positive lens,
focusing from infinity to a close object is carried out by moving the rear lens group toward the object, and
the following conditional expression is satisfied:

$$0.015 < \Delta/fT < 0.050$$

where fT denotes a focal length of the zoom lens system in the telephoto end state, and Δ denotes a moving amount of the rear lens group in the telephoto end state from a state focusing on infinity to a state focusing on a close object locating at the distance of ten times of the focal length (fT) in the telephoto end state from the image plane.

19. The method for forming an image of an object and varying a focal length, comprising the steps of:
  providing a zoom lens system that includes, in order from the object, a first lens group having positive refractive power, a second lens group having negative refractive power, and a third lens group having positive refractive power,
    wherein the first lens group comprises, in order from the object, a front lens group having positive refractive power constructed by at least one negative lens and at least one positive lens, and a rear lens group having positive refractive power constructed by a single positive lens;
  varying the focal length of the zoom lens system from the wide-angle end state to the telephoto end state by moving at least the first lens group and the third lens group such that a distance between the first lens group and the second lens group increases and a distance between the second lens group and the third lens group decreases; and
  varying focusing of the zoom lens system from infinity to a close object by moving only the rear lens group toward the object.

20. The method according to claim 19, wherein when a state of lens group positions varies from the wide-angle end state to the telephoto end state, the first lens group is moved toward the object.

21. The method for forming an image of an object and varying a focal length, comprising the steps of:
  providing a zoom lens system that includes, in order from the object, a first lens group having positive refractive power, a second lens group having negative refractive power, and a third lens group having positive refractive power,
    wherein the first lens group comprises, in order from the object, a front lens group having positive refractive power constructed by at least one negative lens and at least one positive lens, and a rear lens group having positive refractive power constructed by a single positive lens, and
    wherein the third lens group comprises, in order from the object, a front lens group of the third lens group having positive refractive power, a middle lens group of the third lens group having negative refractive power, and a rear lens group of the third lens group;
  varying the focal length of the zoom lens system from a wide-angle end state to a telephoto end state by increasing a distance between the first lens group and the second lens group, and by decreasing a distance between the second lens group and the third lens group;
  varying focusing of the zoom lens system from infinity to a close object by moving only the rear lens group toward the object; and
  correcting a camera shake by moving the middle lens group of the third lens group perpendicularly to the optical axis.

22. The method for forming an image of an object and varying a focal length, comprising the steps of:
  providing a zoom lens system that includes, in order from the object, a first lens group having positive refractive power, a second lens group having negative refractive power, and a third lens group having positive refractive power,
    wherein the first lens group comprises, in order from the object, a front lens group having positive refractive power constructed by at least one negative lens and at least one positive lens, and a rear lens group having positive refractive power constructed by a single positive lens;
  varying the focal length of the zoom lens system from a wide-angle end state to a telephoto end state by increasing a distance between the first lens group and the second lens group, and by decreasing a distance between the second lens group and the third lens group; and
  varying focusing of the zoom lens system from infinity to a close object by moving only the rear lens group toward the object,
  wherein the following conditional expression is satisfied:

$$1.1 < fT/f1b < 2.0$$

where fT denotes a focal length of the zoom lens system in the telephoto end state, and f1b denotes a focal length of the rear lens group.

23. A zoom lens system comprising, in order from an object:
  a first lens group having positive refractive power;
  a second lens group having negative refractive power; and
  a third lens group having positive refractive power,
    wherein when a state of lens group positions varies from a wide-angle end state to a telephoto end state, at least the first lens group and the third lens group are moved such that the first lens group is moved toward the object, a distance between the first lens group and the second lens group increases, and a distance between the second lens group and the third lens group decreases,
    the first lens group comprises, in order from the object, a front lens group having positive refractive power and a rear lens group having positive refractive power,
    the front lens group comprises, in order from the object, at least one negative lens and at least one positive lens,
    the rear lens group consists of a single positive lens, and
    focusing from infinity to a close object is carried out by moving the rear lens group toward the object.

24. A zoom lens system comprising, in order from an object:
  a first lens group having positive refractive power;
  a second lens group having negative refractive power; and
  a third lens group having positive refractive power,
    wherein when a state of lens group positions varies from a wide-angle end state to a telephoto end state, at least the first lens group and the third lens group are moved such that the third lens group is moved toward the object, a distance between the first lens group and the second lens group increases, and a distance between the second lens group and the third lens group decreases,
    the first lens group comprises, in order from the object, a front lens group having positive refractive power and a rear lens group having positive refractive power,
    the front lens group comprises, in order from the object, at least one negative lens and at least one positive lens,
    the rear lens group consists of a single positive lens, and
    focusing from infinity to a close object is carried out by moving the rear lens group toward the object.

* * * * *